(12) United States Patent
Olson et al.

(10) Patent No.: US 11,410,230 B1
(45) Date of Patent: Aug. 9, 2022

(54) REALTIME ACCESS AND CONTROL OF SECURE REGULATED DATA

(71) Applicant: ConsumerInfo. com, Inc., Costa Mesa, CA (US)

(72) Inventors: Gregory Thomas Olson, Trabuco Canyon, CA (US); Nelson Yu, El Monte, CA (US); Roman Bercot, Aliso Viejo, CA (US); Michelle Felice-Steele, Woodland Hills, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 558 days.

(21) Appl. No.: 15/353,707

(22) Filed: Nov. 16, 2016

Related U.S. Application Data

(60) Provisional application No. 62/256,634, filed on Nov. 17, 2015.

(51) Int. Cl.
*G06Q 40/02* (2012.01)
*G06F 21/62* (2013.01)
*G06F 21/31* (2013.01)

(52) U.S. Cl.
CPC .......... *G06Q 40/025* (2013.01); *G06F 21/31* (2013.01); *G06F 21/6245* (2013.01)

(58) Field of Classification Search
CPC .... G06F 3/0488; G06F 21/31; G06F 21/6245; G06Q 30/02; G06Q 20/24; G06Q 40/025
See application file for complete search history.

(56) References Cited

U.S. PATENT DOCUMENTS

| 3,316,395 A | 4/1967 | Lavin et al. |
| 4,305,059 A | 12/1981 | Benton |

(Continued)

FOREIGN PATENT DOCUMENTS

| CA | 2 611 595 | 12/2006 |
| CN | 1290373 | 4/2001 |

(Continued)

OTHER PUBLICATIONS

Abrahams, Steven W., "The New View in Mortgage Prepayments: Insight from Analysis at the Loan-By-Loan Level," The Journal of Fixed Income, Jun. 1997, vol. 7, No. 1, pp. 8-21.

(Continued)

*Primary Examiner* — Bennett M Sigmond
*Assistant Examiner* — Marla Hudson
(74) *Attorney, Agent, or Firm* — Knobbe, Martens, Olson & Bear, LLP

(57) ABSTRACT

The systems and methods described herein allow users to control access to regulated data of the user (stored in a secured third party database) through interaction on a mobile device (or other computing device), such as to provide a touch gesture on the mobile device that causes the users regulated data to be accessible to a third party. The regulated data may include credit data of the user, such as a credit report or credit file. Access rights to the regulated data may be provided in real-time (or near real-time) in response to a request for the data from a third party, for example. The system may allow a user to respond to an alert or notification that is automatically sent to the computing device of the user in response to a request for a secure regulated data of the user.

18 Claims, 11 Drawing Sheets

(56) References Cited

U.S. PATENT DOCUMENTS

| | | |
|---|---|---|
| 4,578,530 A | 3/1986 | Zeidler |
| 4,736,294 A | 4/1988 | Gill |
| 4,774,664 A | 9/1988 | Campbell et al. |
| 4,876,592 A | 10/1989 | Von Kohorn |
| 4,891,503 A | 1/1990 | Jewell |
| 4,895,518 A | 1/1990 | Arnold |
| 4,947,028 A | 8/1990 | Gorog |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,317,636 A | 5/1994 | Vizcaino |
| 5,317,733 A | 5/1994 | Murdock |
| 5,336,870 A | 8/1994 | Hughes et al. |
| 5,361,201 A | 11/1994 | Jost et al. |
| 5,590,038 A | 12/1996 | Pitroda |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,659,725 A | 8/1997 | Levy et al. |
| 5,696,907 A | 12/1997 | Tom |
| 5,699,527 A | 12/1997 | Davidson |
| 5,704,029 A | 12/1997 | Wright, Jr. |
| 5,708,422 A | 1/1998 | Blonder et al. |
| 5,732,400 A | 3/1998 | Mandler |
| 5,745,654 A | 4/1998 | Titan |
| 5,745,706 A | 4/1998 | Wolfberg et al. |
| 5,748,098 A | 5/1998 | Grace |
| 5,774,883 A | 6/1998 | Andersen |
| 5,793,972 A | 8/1998 | Shane |
| 5,802,142 A | 9/1998 | Browne |
| 5,844,218 A | 12/1998 | Kawan et al. |
| 5,857,174 A | 1/1999 | Dugan |
| 5,870,721 A | 2/1999 | Norris |
| 5,875,236 A | 2/1999 | Jankowitz |
| 5,878,403 A | 3/1999 | DeFrancesco |
| 5,884,287 A | 3/1999 | Edesess |
| 5,914,472 A | 6/1999 | Foladare et al. |
| 5,918,217 A | 6/1999 | Maggioncalda et al. |
| 5,924,082 A | 7/1999 | Silverman et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,953,710 A | 9/1999 | Fleming |
| 5,956,693 A | 9/1999 | Geerlings |
| 5,966,695 A | 10/1999 | Melchione et al. |
| 5,978,780 A | 11/1999 | Watson |
| 5,991,411 A | 11/1999 | Kaufman et al. |
| 5,995,947 A | 11/1999 | Fraser et al. |
| 6,012,044 A | 1/2000 | Maggioncalda et al. |
| 6,014,645 A | 1/2000 | Cunningham |
| 6,021,397 A | 2/2000 | Jones et al. |
| 6,029,149 A | 2/2000 | Dykstra et al. |
| 6,029,178 A | 2/2000 | Martin et al. |
| 6,038,551 A | 3/2000 | Barlow et al. |
| 6,055,570 A | 4/2000 | Nielsen |
| 6,064,987 A | 5/2000 | Walker |
| 6,070,141 A | 5/2000 | Houvener |
| 6,070,147 A | 5/2000 | Harms et al. |
| 6,078,922 A | 6/2000 | Johnson et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,115,690 A | 9/2000 | Wong |
| 6,115,694 A | 9/2000 | Cheetham et al. |
| 6,119,103 A | 9/2000 | Basch et al. |
| 6,128,599 A | 10/2000 | Walker |
| 6,128,603 A | 10/2000 | Dent |
| 6,154,729 A | 11/2000 | Cannon et al. |
| 6,182,229 B1 | 1/2001 | Nielsen |
| 6,185,543 B1 | 2/2001 | Galperin et al. |
| 6,199,077 B1 | 3/2001 | Inala et al. |
| 6,202,053 B1 | 3/2001 | Christiansen et al. |
| 6,249,770 B1 | 6/2001 | Erwin et al. |
| 6,253,203 B1 | 6/2001 | O'Flaherty et al. |
| 6,269,325 B1 | 7/2001 | Lee et al. |
| 6,275,824 B1 | 8/2001 | O'Flaherty et al. |
| 6,285,987 B1 | 9/2001 | Roth et al. |
| 6,298,348 B1 | 10/2001 | Eldering |
| 6,304,860 B1 | 10/2001 | Martin et al. |
| 6,311,169 B2 | 10/2001 | Duhon |
| 6,317,783 B1 | 11/2001 | Freishtat et al. |
| 6,324,524 B1 | 11/2001 | Lent et al. |
| 6,330,546 B1 | 12/2001 | Gopinathan et al. |
| 6,330,575 B1 | 12/2001 | Moore |
| 6,339,790 B1 | 1/2002 | Inoue |
| 6,374,264 B1 | 4/2002 | Bohannon et al. |
| 6,384,844 B1 | 5/2002 | Stewart et al. |
| 6,385,594 B1 | 5/2002 | Lebda et al. |
| 6,397,224 B1 | 5/2002 | Zubeldia et al. |
| 6,405,173 B1 | 6/2002 | Honarvar |
| 6,405,181 B2 | 6/2002 | Lent et al. |
| 6,430,539 B1 | 8/2002 | Lazarus et al. |
| 6,487,540 B1 | 11/2002 | Smith et al. |
| 6,529,880 B1 | 3/2003 | McKeen et al. |
| 6,532,450 B1 | 3/2003 | Brown et al. |
| 6,542,894 B1 | 4/2003 | Lee et al. |
| 6,567,791 B2 | 5/2003 | Lent et al. |
| 6,581,075 B1 | 6/2003 | Guturu et al. |
| 6,611,816 B2 | 8/2003 | Lebda et al. |
| 6,622,131 B1 | 9/2003 | Brown et al. |
| 6,622,266 B1 | 9/2003 | Goddard et al. |
| 6,629,245 B1 | 9/2003 | Stone et al. |
| 6,636,803 B1 | 10/2003 | Hartz, Jr. et al. |
| 6,658,393 B1 | 12/2003 | Basch et al. |
| 6,782,390 B2 | 8/2004 | Lee et al. |
| 6,804,346 B1 | 10/2004 | Mewhinney |
| 6,805,287 B2 | 10/2004 | Bishop et al. |
| 6,823,319 B1 | 11/2004 | Lynch et al. |
| 6,832,229 B2 | 12/2004 | Reed |
| 6,839,690 B1 | 1/2005 | Foth et al. |
| 6,842,782 B1 | 1/2005 | Malik et al. |
| 6,873,972 B1 | 3/2005 | Marcial et al. |
| 6,901,406 B2 | 5/2005 | Nabe et al. |
| 6,910,624 B1 | 6/2005 | Natsuno |
| 6,912,483 B2 | 6/2005 | Frederick |
| 6,950,807 B2 | 9/2005 | Brock |
| 6,962,336 B2 | 11/2005 | Glass |
| 6,985,887 B1 | 1/2006 | Sunstein et al. |
| 6,988,085 B2 | 1/2006 | Hedy |
| 7,003,476 B1 | 2/2006 | Samra et al. |
| 7,013,310 B2 | 3/2006 | Messing et al. |
| 7,016,870 B1 | 3/2006 | Jones et al. |
| 7,028,052 B2 | 4/2006 | Chapman et al. |
| 7,058,817 B1 | 6/2006 | Ellmore |
| 7,062,458 B2 | 6/2006 | Maggioncalda et al. |
| 7,065,566 B2 | 6/2006 | Menard et al. |
| 7,069,249 B2 | 6/2006 | Stolfo et al. |
| 7,076,462 B1 | 7/2006 | Nelson et al. |
| 7,076,475 B2 | 7/2006 | Honarvar et al. |
| 7,083,087 B1 | 8/2006 | Gangi |
| 7,107,249 B2 | 9/2006 | Dively et al. |
| 7,117,172 B1 | 10/2006 | Black |
| 7,120,599 B2 | 10/2006 | Keyes |
| 7,143,063 B2 | 11/2006 | Lent |
| 7,165,037 B2 | 1/2007 | Lazarus et al. |
| 7,213,064 B2 | 5/2007 | Smith et al. |
| 7,229,006 B2 | 6/2007 | Babbi et al. |
| 7,243,075 B1 | 7/2007 | Shaffer et al. |
| 7,249,076 B1 | 7/2007 | Pendleton et al. |
| 7,254,558 B2 | 8/2007 | Hinkle et al. |
| 7,263,497 B1 | 8/2007 | Wiser et al. |
| 7,280,980 B1 | 10/2007 | Hoadley et al. |
| 7,280,983 B2 | 10/2007 | Kuroda et al. |

(56) References Cited

U.S. PATENT DOCUMENTS

| | | | |
|---|---|---|---|
| 7,296,734 | B2 | 11/2007 | Pliha |
| 7,302,420 | B2 | 11/2007 | Aggarwal et al. |
| 7,308,417 | B1 | 12/2007 | Nathan |
| 7,314,166 | B2 | 1/2008 | Anderson et al. |
| 7,318,224 | B2 | 1/2008 | Honarvar et al. |
| 7,330,835 | B2 | 2/2008 | Deggendorf |
| 7,333,635 | B2 | 2/2008 | Tsantes et al. |
| 7,333,937 | B2 | 2/2008 | Baldwin, Jr. et al. |
| 7,337,133 | B1 | 2/2008 | Bezos et al. |
| 7,337,468 | B2 | 2/2008 | Metzger |
| 7,366,694 | B2 | 4/2008 | Lazerson |
| 7,376,603 | B1 | 5/2008 | Mayr et al. |
| 7,383,215 | B1 | 6/2008 | Navarro et al. |
| 7,383,988 | B2 | 6/2008 | Slonecker, Jr. |
| 7,386,466 | B2 | 6/2008 | McLean et al. |
| 7,395,232 | B1 | 7/2008 | Pilato |
| 7,403,919 | B2 | 7/2008 | Chacko et al. |
| 7,409,369 | B1 | 8/2008 | Homuth et al. |
| 7,418,417 | B2 | 8/2008 | Chacko et al. |
| 7,451,095 | B1 | 11/2008 | Bradley et al. |
| 7,464,067 | B2 | 12/2008 | Chestnut |
| 7,479,949 | B2 | 1/2009 | Jobs et al. |
| 7,480,631 | B1 | 1/2009 | Merced et al. |
| 7,505,939 | B2 | 3/2009 | Lent et al. |
| 7,529,698 | B2 | 5/2009 | Joao |
| 7,542,993 | B2 | 6/2009 | Satterfield et al. |
| 7,546,266 | B2 | 6/2009 | Beirne et al. |
| 7,552,086 | B1 | 6/2009 | Rajasekar et al. |
| 7,559,217 | B2 | 7/2009 | Bass |
| 7,580,884 | B2 | 8/2009 | Cook |
| 7,584,146 | B1 | 9/2009 | Duhon |
| 7,593,891 | B2 | 9/2009 | Kornegay et al. |
| 7,593,892 | B2 | 9/2009 | Balk et al. |
| 7,596,512 | B1 | 9/2009 | Raines et al. |
| 7,596,716 | B2 | 9/2009 | Frost et al. |
| 7,603,317 | B2 | 10/2009 | Adler et al. |
| 7,610,229 | B1 | 10/2009 | Kornegay |
| 7,620,592 | B2 | 11/2009 | O'Mara et al. |
| 7,624,068 | B1 | 11/2009 | Heasley et al. |
| 7,630,932 | B2 | 12/2009 | Danaher et al. |
| 7,653,592 | B1 | 1/2010 | Flaxman et al. |
| 7,653,593 | B2 | 1/2010 | Zarikian et al. |
| 7,676,418 | B1 | 3/2010 | Chung et al. |
| 7,689,451 | B2 | 3/2010 | Vives |
| 7,689,505 | B2 | 3/2010 | Kasower |
| 7,689,506 | B2 | 3/2010 | Fei et al. |
| 7,708,196 | B2 | 5/2010 | Palmieri et al. |
| 7,711,635 | B2 | 5/2010 | Steele et al. |
| 7,711,636 | B2 | 5/2010 | Robida et al. |
| 7,720,750 | B2 | 5/2010 | Brody |
| 7,729,983 | B1 | 6/2010 | Ellis |
| 7,734,522 | B2 | 6/2010 | Johnson et al. |
| 7,756,789 | B2 | 7/2010 | Welker et al. |
| 7,769,657 | B2 | 8/2010 | Chacko et al. |
| 7,774,257 | B2 | 8/2010 | Maggioncalda et al. |
| 7,774,270 | B1 * | 8/2010 | MacCloskey ........ G06Q 40/025 705/38 |
| 7,788,147 | B2 | 8/2010 | Haggerty et al. |
| 7,788,152 | B2 | 8/2010 | Haggerty et al. |
| 7,788,155 | B2 | 8/2010 | Jones et al. |
| 7,792,715 | B1 | 9/2010 | Kasower |
| 7,792,716 | B2 | 9/2010 | Gooding et al. |
| 7,792,732 | B2 | 9/2010 | Haggerty et al. |
| 7,797,734 | B2 | 9/2010 | Babi et al. |
| 7,801,812 | B2 | 9/2010 | Conlin et al. |
| 7,814,004 | B2 | 10/2010 | Haggerty et al. |
| 7,814,005 | B2 | 10/2010 | Imrey et al. |
| 7,818,228 | B1 | 10/2010 | Coulter |
| 7,818,229 | B2 | 10/2010 | Imrey et al. |
| 7,835,983 | B2 | 11/2010 | Lefner et al. |
| 7,836,111 | B1 | 11/2010 | Shan |
| 7,840,484 | B2 | 11/2010 | Haggerty et al. |
| 7,849,004 | B2 | 12/2010 | Choudhuri et al. |
| 7,853,998 | B2 | 12/2010 | Blaisdell et al. |
| 7,860,782 | B2 | 12/2010 | Cash et al. |
| 7,873,677 | B2 | 1/2011 | Messing et al. |
| 7,877,304 | B1 | 1/2011 | Coulter |
| 7,890,420 | B2 | 2/2011 | Haggerty et al. |
| 7,900,052 | B2 | 3/2011 | Joans |
| 7,904,306 | B2 | 3/2011 | Johnson et al. |
| 7,904,367 | B2 | 3/2011 | Chung et al. |
| 7,908,242 | B1 | 3/2011 | Achanta |
| 7,912,770 | B2 | 3/2011 | Haggerty et al. |
| 7,912,842 | B1 | 3/2011 | Bayliss et al. |
| 7,912,865 | B2 | 3/2011 | Akerman et al. |
| 7,925,578 | B1 | 4/2011 | Hong et al. |
| 7,925,582 | B1 | 4/2011 | Kornegay et al. |
| 7,930,252 | B2 | 4/2011 | Bender et al. |
| 7,937,416 | B2 | 5/2011 | Hossfeld et al. |
| 7,941,365 | B1 | 5/2011 | Bradley et al. |
| 7,945,510 | B1 | 5/2011 | Bradley et al. |
| 7,953,213 | B2 | 5/2011 | Babi et al. |
| 7,966,255 | B2 | 6/2011 | Wong et al. |
| 7,970,676 | B2 | 6/2011 | Feinstein |
| 7,970,679 | B2 | 6/2011 | Kasower |
| 7,970,698 | B2 | 6/2011 | Gupta et al. |
| 7,974,919 | B2 | 7/2011 | Conlin et al. |
| 7,983,975 | B2 | 7/2011 | Jones et al. |
| 7,987,124 | B1 | 7/2011 | Holden et al. |
| 8,001,034 | B2 | 8/2011 | Chung et al. |
| 8,001,041 | B2 | 8/2011 | Hoadley et al. |
| 8,005,738 | B2 | 8/2011 | Chacko et al. |
| 8,005,759 | B2 | 8/2011 | Hirtenstein et al. |
| 8,005,795 | B2 | 8/2011 | Galipeau et al. |
| 8,015,107 | B2 | 9/2011 | Kornegay et al. |
| 8,024,263 | B2 | 9/2011 | Zarikian et al. |
| 8,024,778 | B2 | 9/2011 | Cash et al. |
| 8,032,932 | B2 | 10/2011 | Speyer et al. |
| 8,055,579 | B2 | 11/2011 | Davies et al. |
| 8,060,424 | B2 | 11/2011 | Kasower |
| 8,073,768 | B2 | 12/2011 | Haggerty et al. |
| 8,078,524 | B2 | 12/2011 | Crawford et al. |
| 8,078,527 | B2 | 12/2011 | Cerise et al. |
| 8,086,523 | B1 | 12/2011 | Palmer |
| 8,095,458 | B2 | 1/2012 | Peterson et al. |
| 8,099,356 | B2 | 1/2012 | Feinstein et al. |
| 8,131,614 | B2 | 3/2012 | Haggerty et al. |
| 8,160,960 | B1 | 4/2012 | Fei et al. |
| 8,165,940 | B2 | 4/2012 | Meimes et al. |
| 8,195,549 | B2 | 6/2012 | Kasower |
| 8,204,774 | B2 | 6/2012 | Chwast et al. |
| 8,204,812 | B2 | 6/2012 | Stewart et al. |
| 8,225,395 | B2 | 7/2012 | Atwood et al. |
| 8,234,498 | B2 | 7/2012 | Britti et al. |
| 8,255,971 | B1 | 8/2012 | Webb et al. |
| 8,260,699 | B2 | 9/2012 | Smith et al. |
| 8,285,613 | B1 | 10/2012 | Coulter |
| 8,290,840 | B2 | 10/2012 | Kasower |
| 8,311,936 | B2 | 11/2012 | Haggerty et al. |
| 8,315,942 | B2 | 11/2012 | Haggerty et al. |
| 8,321,334 | B1 | 11/2012 | Kornegay et al. |
| 8,321,339 | B2 | 11/2012 | Imrey et al. |
| 8,327,429 | B2 | 12/2012 | Speyer et al. |
| 8,335,741 | B2 | 12/2012 | Kornegay et al. |
| 8,347,364 | B2 | 1/2013 | Babi et al. |
| 8,359,278 | B2 | 1/2013 | Domenikos et al. |
| 8,386,377 | B1 | 2/2013 | Xiong et al. |
| 8,392,334 | B2 | 3/2013 | Hirtenstein et al. |
| 8,463,595 | B1 | 6/2013 | Rehling et al. |
| 8,473,353 | B2 | 6/2013 | Matsuda et al. |
| 8,478,686 | B1 | 7/2013 | Giles |
| 8,489,502 | B2 | 7/2013 | Morris et al. |
| 8,515,844 | B2 | 8/2013 | Kasower |
| 8,527,596 | B2 | 9/2013 | Long et al. |
| 8,533,118 | B2 | 9/2013 | Weller et al. |
| 8,543,498 | B2 | 9/2013 | Silbernagel et al. |
| 8,560,161 | B2 | 10/2013 | Kator et al. |
| 8,560,436 | B2 | 10/2013 | Ingram et al. |
| 8,571,971 | B1 | 10/2013 | Brown et al. |
| 8,572,083 | B1 | 10/2013 | Snell et al. |
| 8,589,286 | B1 | 11/2013 | Kornegay et al. |
| 8,595,101 | B1 | 11/2013 | Daukas et al. |
| 8,600,886 | B2 | 12/2013 | Ramavarjula et al. |
| 8,606,694 | B2 | 12/2013 | Campbell et al. |

(56) References Cited

U.S. PATENT DOCUMENTS

| | | |
|---|---|---|
| 8,660,919 B2 | 2/2014 | Kasower |
| 8,694,420 B1 | 4/2014 | Oliai |
| 8,725,613 B1 | 5/2014 | Celka et al. |
| 8,732,004 B1 | 5/2014 | Ramos et al. |
| 8,738,516 B1 | 5/2014 | Dean et al. |
| 8,744,956 B1 * | 6/2014 | DiChiara .............. H04L 63/126 705/35 |
| 8,760,417 B2 * | 6/2014 | Haug .................... G06F 3/0383 345/173 |
| 8,762,243 B2 | 6/2014 | Jenkins et al. |
| 8,775,299 B2 | 7/2014 | Achanta et al. |
| 8,781,951 B2 | 7/2014 | Lewis et al. |
| 8,781,953 B2 | 7/2014 | Kasower |
| 8,856,894 B1 | 10/2014 | Dean et al. |
| 8,930,216 B1 | 1/2015 | Johnson et al. |
| 8,930,263 B1 | 1/2015 | Mahacek et al. |
| 8,983,867 B2 | 3/2015 | Stibel et al. |
| 9,015,171 B2 | 4/2015 | Bayliss |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 9,116,918 B1 | 8/2015 | Kim |
| 9,213,461 B2 | 12/2015 | Eraker et al. |
| 9,256,904 B1 * | 2/2016 | Haller .................... G06Q 40/00 |
| 9,443,268 B1 | 9/2016 | Kapczynski et al. |
| 9,449,346 B1 | 9/2016 | Hockey et al. |
| 9,558,519 B1 | 1/2017 | Burger |
| 9,569,797 B1 | 2/2017 | Rohn et al. |
| 9,595,023 B1 | 3/2017 | Hockey et al. |
| 9,607,336 B1 | 3/2017 | Dean et al. |
| 9,690,820 B1 | 6/2017 | Girulat, Jr. |
| 9,710,852 B1 | 7/2017 | Olson et al. |
| 9,892,457 B1 | 2/2018 | Kapczynski |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,380,654 B2 | 8/2019 | Hirtenstein et al. |
| 10,523,653 B2 | 12/2019 | Hockey et al. |
| 10,528,545 B1 | 1/2020 | Girulat, Jr. |
| 10,530,761 B2 | 1/2020 | Hockey et al. |
| 10,565,643 B2 | 2/2020 | Rohn et al. |
| 10,586,279 B1 | 3/2020 | Ramos et al. |
| 10,614,463 B1 | 4/2020 | Hockey et al. |
| 10,671,749 B2 | 6/2020 | Felice-Steele et al. |
| 10,726,491 B1 | 7/2020 | Hockey et al. |
| 10,757,154 B1 | 8/2020 | Jacobs et al. |
| 10,880,313 B2 | 12/2020 | Manna et al. |
| 10,937,090 B1 | 3/2021 | Debie et al. |
| 10,949,428 B2 | 3/2021 | Poirel et al. |
| 11,025,629 B2 | 6/2021 | Chasman et al. |
| 11,025,638 B2 | 6/2021 | Ford et al. |
| 11,050,767 B2 | 6/2021 | Black et al. |
| 11,157,997 B2 | 10/2021 | Robida et al. |
| 11,159,593 B1 | 10/2021 | Jacobs et al. |
| 2001/0011247 A1 | 8/2001 | O'Flaherty et al. |
| 2001/0027413 A1 | 10/2001 | Bhutta |
| 2001/0039523 A1 | 11/2001 | Iwamoto |
| 2001/0042785 A1 | 11/2001 | Walker et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0035520 A1 | 3/2002 | Weiss |
| 2002/0049624 A1 | 4/2002 | Raveis, Jr. |
| 2002/0052836 A1 | 5/2002 | Galperin et al. |
| 2002/0069122 A1 | 6/2002 | Yun et al. |
| 2002/0077964 A1 | 6/2002 | Brody et al. |
| 2002/0091650 A1 | 7/2002 | Ellis |
| 2002/0099641 A1 | 7/2002 | Mills et al. |
| 2002/0099824 A1 | 7/2002 | Bender et al. |
| 2002/0107765 A1 | 8/2002 | Walker |
| 2002/0111890 A1 | 8/2002 | Sloan et al. |
| 2002/0128962 A1 | 9/2002 | Kasower |
| 2002/0147669 A1 | 10/2002 | Taylor et al. |
| 2002/0147695 A1 | 10/2002 | Khedkar et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0174124 A1 | 11/2002 | Haas et al. |
| 2002/0178146 A1 | 11/2002 | Akella et al. |
| 2002/0194117 A1 | 12/2002 | Nabe et al. |
| 2002/0198736 A1 | 12/2002 | Harrison |
| 2002/0198806 A1 | 12/2002 | Blagg et al. |
| 2002/0198824 A1 | 12/2002 | Cook |
| 2003/0009415 A1 | 1/2003 | Lutnick et al. |
| 2003/0009418 A1 | 1/2003 | Green et al. |
| 2003/0018549 A1 | 1/2003 | Fei et al. |
| 2003/0028477 A1 | 2/2003 | Stevenson et al. |
| 2003/0041031 A1 | 2/2003 | Hedy |
| 2003/0046222 A1 | 3/2003 | Bard et al. |
| 2003/0064705 A1 | 4/2003 | Desierio |
| 2003/0065563 A1 | 4/2003 | Elliott et al. |
| 2003/0078897 A1 | 4/2003 | Florance et al. |
| 2003/0101111 A1 | 5/2003 | Dang et al. |
| 2003/0115122 A1 | 6/2003 | Slater et al. |
| 2003/0154162 A1 | 8/2003 | Danaher et al. |
| 2003/0158960 A1 | 8/2003 | Engberg |
| 2003/0163435 A1 | 8/2003 | Payone |
| 2003/0172039 A1 | 9/2003 | Guy |
| 2003/0177091 A1 | 9/2003 | Paglin |
| 2003/0187780 A1 | 10/2003 | Arthus et al. |
| 2003/0195830 A1 | 10/2003 | Merkoulovitch et al. |
| 2003/0204752 A1 | 10/2003 | Garrison |
| 2003/0212618 A1 | 11/2003 | Keyes et al. |
| 2003/0229580 A1 | 12/2003 | Gass et al. |
| 2003/0236738 A1 | 12/2003 | Lange et al. |
| 2004/0006536 A1 | 1/2004 | Kawashima et al. |
| 2004/0023637 A1 | 2/2004 | Johnson et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0111292 A1 | 6/2004 | Hutchins |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117302 A1 | 6/2004 | Weichert et al. |
| 2004/0133493 A1 | 7/2004 | Ford et al. |
| 2004/0138995 A1 | 7/2004 | Hershkowitz et al. |
| 2004/0143546 A1 | 7/2004 | Wood et al. |
| 2004/0153437 A1 | 8/2004 | Buchan |
| 2004/0158521 A1 | 8/2004 | Newton |
| 2004/0158723 A1 | 8/2004 | Root |
| 2004/0159700 A1 | 8/2004 | Khan et al. |
| 2004/0186807 A1 | 9/2004 | Nathans et al. |
| 2004/0193535 A1 | 9/2004 | Barazesh |
| 2004/0199456 A1 | 10/2004 | Flint et al. |
| 2004/0215584 A1 | 10/2004 | Yao |
| 2004/0243450 A1 | 12/2004 | Bernard, Jr. et al. |
| 2004/0243506 A1 | 12/2004 | Das |
| 2004/0249532 A1 | 12/2004 | Kelly et al. |
| 2004/0255127 A1 | 12/2004 | Arnouse |
| 2005/0004855 A1 | 1/2005 | Jenson et al. |
| 2005/0010513 A1 | 1/2005 | Duckworth et al. |
| 2005/0027633 A1 | 2/2005 | Fortuna et al. |
| 2005/0055275 A1 | 3/2005 | Newman et al. |
| 2005/0080697 A1 | 4/2005 | Foss et al. |
| 2005/0080716 A1 | 4/2005 | Belyi et al. |
| 2005/0080821 A1 | 4/2005 | Breil et al. |
| 2005/0086126 A1 | 4/2005 | Patterson |
| 2005/0086176 A1 | 4/2005 | Dahlgren |
| 2005/0096950 A1 | 5/2005 | Caplan et al. |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102226 A1 | 5/2005 | Oppenheimer et al. |
| 2005/0105719 A1 | 5/2005 | Huda |
| 2005/0125291 A1 | 6/2005 | Demkiw Grayson et al. |
| 2005/0125350 A1 | 6/2005 | Tidwell et al. |
| 2005/0130704 A1 | 6/2005 | McFarland et al. |

(56) References Cited

U.S. PATENT DOCUMENTS

| | | |
|---|---|---|
| 2005/0137963 A1 | 6/2005 | Ricketts et al. |
| 2005/0154617 A1 | 7/2005 | Ruggieri et al. |
| 2005/0154664 A1 | 7/2005 | Guy et al. |
| 2005/0154769 A1 | 7/2005 | Eckart et al. |
| 2005/0159996 A1 | 7/2005 | Lazaraus et al. |
| 2005/0203768 A1 | 9/2005 | Florance |
| 2005/0267840 A1 | 12/2005 | Holm-Blagg et al. |
| 2005/0273431 A1 | 12/2005 | Abel et al. |
| 2006/0014129 A1 | 1/2006 | Coleman et al. |
| 2006/0031158 A1 | 2/2006 | Orman |
| 2006/0059073 A1 | 3/2006 | Walzak |
| 2006/0080251 A1 | 4/2006 | Fried et al. |
| 2006/0095363 A1 | 5/2006 | May |
| 2006/0100954 A1 | 5/2006 | Schoen |
| 2006/0123461 A1 | 6/2006 | Lunt et al. |
| 2006/0131390 A1 | 6/2006 | Kim |
| 2006/0149674 A1 | 7/2006 | Cook et al. |
| 2006/0155639 A1 | 7/2006 | Lynch et al. |
| 2006/0163347 A1 | 7/2006 | Foss et al. |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0195351 A1 | 8/2006 | Bayburtian |
| 2006/0195391 A1 | 8/2006 | Stanelle |
| 2006/0212386 A1 | 9/2006 | Willey et al. |
| 2006/0229799 A1 | 10/2006 | Nimmo et al. |
| 2006/0229996 A1 | 10/2006 | Ley et al. |
| 2006/0233332 A1 | 10/2006 | Toms |
| 2006/0241923 A1 | 10/2006 | Xu et al. |
| 2006/0248106 A1 | 11/2006 | Milne et al. |
| 2006/0259364 A1 | 11/2006 | Strock et al. |
| 2006/0265323 A1 | 11/2006 | Winter et al. |
| 2006/0267999 A1 | 11/2006 | Cash et al. |
| 2006/0271633 A1 | 11/2006 | Adler |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293979 A1 | 12/2006 | Cash et al. |
| 2006/0294199 A1 | 12/2006 | Bertholf |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0038568 A1 | 2/2007 | Greene et al. |
| 2007/0078741 A1 | 4/2007 | Haggerty et al. |
| 2007/0083463 A1 | 4/2007 | Kraft |
| 2007/0093234 A1 | 4/2007 | Willis et al. |
| 2007/0112668 A1 | 5/2007 | Celano et al. |
| 2007/0156718 A1 | 7/2007 | Hossfeld et al. |
| 2007/0168267 A1 | 7/2007 | Zimmerman et al. |
| 2007/0179798 A1 | 8/2007 | Inbarajan |
| 2007/0208640 A1 | 9/2007 | Banasiak et al. |
| 2007/0214000 A1 | 9/2007 | Shahrabi et al. |
| 2007/0226093 A1 | 9/2007 | Chan et al. |
| 2007/0226114 A1 | 9/2007 | Haggerty et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0266439 A1 | 11/2007 | Kraft |
| 2007/0282736 A1 | 12/2007 | Conlin et al. |
| 2007/0288338 A1 | 12/2007 | Hoadley |
| 2007/0288490 A1 | 12/2007 | Longshaw |
| 2007/0299770 A1 | 12/2007 | Delinsky |
| 2007/0299771 A1 | 12/2007 | Brody |
| 2008/0010203 A1 | 1/2008 | Grant |
| 2008/0027841 A1 | 1/2008 | Eder |
| 2008/0027859 A1 | 1/2008 | Nathans et al. |
| 2008/0052224 A1 | 2/2008 | Parker |
| 2008/0059317 A1 | 3/2008 | Chandran et al. |
| 2008/0059364 A1 | 3/2008 | Tidwell et al. |
| 2008/0065530 A1 | 3/2008 | Talbert et al. |
| 2008/0103799 A1 | 5/2008 | Domenikos et al. |
| 2008/0109740 A1 | 5/2008 | Prinsen et al. |
| 2008/0133322 A1 | 6/2008 | Kalla et al. |
| 2008/0140507 A1 | 6/2008 | Hamlisch et al. |
| 2008/0162383 A1* | 7/2008 | Kraft ............... G06Q 99/00 705/500 |
| 2008/0172324 A1 | 7/2008 | Johnson |
| 2008/0177655 A1 | 7/2008 | Zalik |
| 2008/0195548 A1 | 8/2008 | Chu et al. |
| 2008/0201257 A1 | 8/2008 | Lewis et al. |
| 2008/0205774 A1 | 8/2008 | Brinker et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0294996 A1 | 11/2008 | Hunt et al. |
| 2008/0312969 A1 | 12/2008 | Raines et al. |
| 2009/0007231 A1 | 1/2009 | Kaiser et al. |
| 2009/0012889 A1 | 1/2009 | Finch |
| 2009/0018996 A1 | 1/2009 | Hunt et al. |
| 2009/0055322 A1 | 2/2009 | Bykov et al. |
| 2009/0089190 A1 | 4/2009 | Girulat |
| 2009/0099960 A1 | 4/2009 | Robida et al. |
| 2009/0106846 A1 | 4/2009 | Dupray et al. |
| 2009/0119199 A1 | 5/2009 | Salahi |
| 2009/0119299 A1 | 5/2009 | Rhodes |
| 2009/0132347 A1 | 5/2009 | Anderson et al. |
| 2009/0144160 A1 | 6/2009 | Haggerty et al. |
| 2009/0158030 A1 | 6/2009 | Rasti |
| 2009/0171723 A1 | 7/2009 | Jenkins |
| 2009/0210886 A1 | 8/2009 | Bhojwani et al. |
| 2009/0222375 A1 | 9/2009 | Choudhuri et al. |
| 2009/0222377 A1 | 9/2009 | Choudhuri et al. |
| 2009/0222379 A1 | 9/2009 | Choudhuri et al. |
| 2009/0240624 A1 | 9/2009 | James et al. |
| 2009/0271248 A1 | 10/2009 | Sherman et al. |
| 2009/0289110 A1 | 11/2009 | Regen et al. |
| 2009/0299911 A1 | 12/2009 | Abrahams et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0023434 A1 | 1/2010 | Bond |
| 2010/0082476 A1 | 4/2010 | Bowman |
| 2010/0114744 A1 | 5/2010 | Gonen |
| 2010/0122316 A1 | 5/2010 | Lyon |
| 2010/0174638 A1 | 7/2010 | Debie et al. |
| 2010/0223168 A1 | 9/2010 | Haggerty et al. |
| 2010/0223211 A1 | 9/2010 | Johnson et al. |
| 2010/0228658 A1 | 9/2010 | Ketelsen et al. |
| 2010/0250411 A1 | 9/2010 | Ogrodski |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0029427 A1 | 2/2011 | Haggerty et al. |
| 2011/0060654 A1 | 3/2011 | Elliott et al. |
| 2011/0060673 A1 | 3/2011 | Delinsky et al. |
| 2011/0078073 A1 | 3/2011 | Annappindi et al. |
| 2011/0125632 A1 | 5/2011 | Neel |
| 2011/0137924 A1 | 6/2011 | Hunt et al. |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0282779 A1 | 11/2011 | Megdal et al. |
| 2011/0295733 A1 | 12/2011 | Megdal et al. |
| 2012/0005070 A1 | 1/2012 | McFall et al. |
| 2012/0066106 A1 | 3/2012 | Papadimitriou |
| 2012/0101938 A1 | 4/2012 | Sower |
| 2012/0101939 A1 | 4/2012 | Sower |
| 2012/0116951 A1 | 5/2012 | Chung et al. |
| 2012/0123931 A1 | 5/2012 | Megdal et al. |
| 2012/0136774 A1 | 5/2012 | Imrey et al. |
| 2012/0191596 A1 | 7/2012 | Kremen et al. |

(56) References Cited

U.S. PATENT DOCUMENTS

| | | |
|---|---|---|
| 2012/0246048 A1 | 9/2012 | Cohen et al. |
| 2012/0253852 A1 | 10/2012 | Pourfallah et al. |
| 2012/0254018 A1 | 10/2012 | Davies et al. |
| 2012/0265661 A1 | 10/2012 | Megdal et al. |
| 2012/0271660 A1 | 10/2012 | Harris et al. |
| 2012/0278767 A1 | 11/2012 | Stibel et al. |
| 2012/0324388 A1 | 12/2012 | Rao et al. |
| 2012/0330689 A1 | 12/2012 | McLaughlin et al. |
| 2013/0006825 A1 | 1/2013 | Robida et al. |
| 2013/0007891 A1 | 1/2013 | Mogaki |
| 2013/0018795 A1 | 1/2013 | Kolhatkar et al. |
| 2013/0103571 A1 | 4/2013 | Chung et al. |
| 2013/0110565 A1 | 5/2013 | Means et al. |
| 2013/0117087 A1 | 5/2013 | Coppinger |
| 2013/0173451 A1 | 7/2013 | Kornegay et al. |
| 2013/0173481 A1 | 7/2013 | Hirtenstein et al. |
| 2013/0191261 A1 | 7/2013 | Chandler et al. |
| 2013/0205135 A1 | 8/2013 | Lutz |
| 2013/0317954 A1 | 11/2013 | Psota et al. |
| 2013/0332338 A1 | 12/2013 | Yan et al. |
| 2013/0332341 A1 | 12/2013 | Papadimitriou |
| 2013/0339249 A1 | 12/2013 | Weller et al. |
| 2014/0012734 A1 | 1/2014 | Megdal et al. |
| 2014/0019333 A1 | 1/2014 | Morris et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0081835 A1 | 3/2014 | Choudhuri et al. |
| 2014/0110477 A1 | 4/2014 | Hammad |
| 2014/0156501 A1 | 6/2014 | Howe |
| 2014/0258089 A1 | 9/2014 | Pearson et al. |
| 2014/0279329 A1 | 9/2014 | Dancel |
| 2014/0279382 A1 | 9/2014 | Drakeley et al. |
| 2014/0372367 A1 | 12/2014 | McLean et al. |
| 2015/0026014 A1 | 1/2015 | Kasower |
| 2015/0073929 A1 | 3/2015 | Psota et al. |
| 2015/0112874 A1 | 4/2015 | Serio et al. |
| 2015/0161738 A1 | 6/2015 | Stempora |
| 2015/0186529 A1 | 7/2015 | Rope |
| 2015/0199757 A1 | 7/2015 | Lindholme et al. |
| 2015/0200948 A1 | 7/2015 | Cairns et al. |
| 2015/0228016 A1 | 8/2015 | Chandler |
| 2016/0125412 A1* | 5/2016 | Cannon ............... G06Q 20/4014 705/44 |
| 2016/0224996 A1 | 8/2016 | Hunt et al. |
| 2017/0161486 A1 | 6/2017 | Jeon et al. |
| 2017/0228820 A1 | 8/2017 | Rohn |
| 2017/0262758 A1 | 9/2017 | Boyapalle et al. |
| 2017/0323063 A1 | 11/2017 | Krause et al. |
| 2017/0323358 A1 | 11/2017 | Psota et al. |
| 2017/0352014 A1 | 12/2017 | Smith et al. |
| 2018/0040063 A1 | 2/2018 | Buechler et al. |
| 2018/0082371 A1 | 3/2018 | Chandler |
| 2018/0176267 A1 | 6/2018 | Malatesha et al. |
| 2018/0204279 A1 | 7/2018 | Painter et al. |
| 2018/0218069 A1 | 8/2018 | Rege et al. |
| 2018/0218448 A1 | 8/2018 | Thomas et al. |
| 2018/0285886 A1 | 10/2018 | Yan et al. |
| 2019/0019185 A1 | 1/2019 | Chitalia et al. |
| 2019/0034625 A1 | 1/2019 | Ford et al. |
| 2019/0066203 A1 | 2/2019 | Smith et al. |
| 2019/0102832 A1 | 4/2019 | Robida et al. |
| 2019/0156227 A1 | 5/2019 | Duke et al. |
| 2019/0188717 A1 | 6/2019 | Putnam et al. |
| 2019/0318122 A1 | 10/2019 | Hockey et al. |
| 2020/0034927 A1 | 1/2020 | Smith et al. |
| 2020/0074099 A1 | 3/2020 | Felice-Steele et al. |
| 2020/0074100 A1 | 3/2020 | Raneri et al. |
| 2020/0074541 A1 | 3/2020 | Finneran et al. |
| 2020/0074542 A1 | 3/2020 | Manna et al. |
| 2020/0076813 A1 | 3/2020 | Felice-Steele et al. |
| 2020/0106764 A1 | 4/2020 | Hockey et al. |
| 2020/0106765 A1 | 4/2020 | Hockey et al. |
| 2020/0201878 A1 | 6/2020 | Putnam et al. |
| 2020/0202425 A1 | 6/2020 | Taylor-Shoff et al. |
| 2020/0211099 A1 | 7/2020 | Smith et al. |
| 2020/0213206 A1 | 7/2020 | Bracken et al. |
| 2020/0233850 A1 | 7/2020 | Girulat, Jr. |
| 2020/0327610 A1 | 10/2020 | Rohn et al. |
| 2020/0372506 A1 | 11/2020 | Billman et al. |
| 2020/0389461 A1 | 12/2020 | Felice-Steele et al. |
| 2021/0194885 A1 | 6/2021 | Manna |

FOREIGN PATENT DOCUMENTS

| | | |
|---|---|---|
| EP | 0 350 907 | 1/1990 |
| EP | 0 468 440 | 1/1992 |
| EP | 0 566 736 | 8/1993 |
| EP | 0 869 652 | 10/1998 |
| EP | 0 913 789 | 5/1999 |
| EP | 0 919 942 | 6/1999 |
| EP | 1 028 401 | 8/2000 |
| EP | 1 550 960 | 7/2005 |
| JP | 2001-282957 | 10/2001 |
| JP | 2002-163449 | 6/2002 |
| JP | 2003-016261 | 1/2003 |
| JP | 2003-316950 | 11/2003 |
| KR | 10-0638324 | 10/2006 |
| MX | 2007-015510 | 4/2008 |
| TW | I256569 | 6/2006 |
| WO | WO 97/022073 | 6/1997 |
| WO | WO 99/046710 | 9/1999 |
| WO | WO 00/011574 | 3/2000 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/057720 | 8/2001 |
| WO | WO 01/080053 | 10/2001 |
| WO | WO 01/084281 | 11/2001 |
| WO | WO 2004/114160 | 12/2004 |
| WO | WO 2005/022348 | 3/2005 |
| WO | WO 2005/029369 | 3/2005 |
| WO | WO 2005/107405 | 11/2005 |
| WO | WO 2005/124619 | 12/2005 |
| WO | WO 2006/099492 | 9/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2009/061342 | 5/2009 |
| WO | WO 2009/064840 | 5/2009 |
| WO | WO 2009/099448 | 8/2009 |
| WO | WO 2010/129257 | 11/2010 |
| WO | WO 2016/070096 | 5/2016 |
| WO | WO 2018/144612 | 8/2018 |
| WO | WO 2019/103979 | 5/2019 |
| WO | WO 2020/051154 | 3/2020 |
| WO | WO 2020/132026 | 6/2020 |

OTHER PUBLICATIONS

AISG's National Underwriting Database, A-PLUS, is Now the Largest in the Industry, Business Wire, Aug. 7, 1997.

Announcing TrueProfiler, http://web.archive.org/web/20021201123646/http://www.truecredit.com/index.asp, dated Dec. 1, 2002, 2 pages.

"AT&T Expected to Turn Up Heat in Card Wars", American Banker, May 27, 1993, vol. 158, No. 101, pp. 3.

Avery et al., "Consumer Credit Scoring: Do Situational Circumstances Matter?", Journal of Banking & Finance, vol. 28, 2004, pp. 835-856.

Awoonor-Williams, Princess Josephine, Ph.D. "Gender and Credit: An Analysis of Women's Experience in the Credit Market", ProQuest Dissertations and Theses, 2004, pp. 148.

"Balance Transfers Offer Opportunities", Risk Credit Risk Management Report, Jan. 29, 1996, vol. 6, No. 2, pp. 2.

Bancroft, John, "Tools Help Managers with Risk Management," Real Estate Finance Today, May 26, 1997, pp. 11-12.

"Bank of America Direct Web-Based Network Adds Core Functionality To Meet Day-To-Day Treasury Needs", Business Wire, Oct. 25, 1999. pp. 2.

(56) References Cited

OTHER PUBLICATIONS

Barone, Robert P., "The Integrated Approach to Branch Service Delivery," American Banker, Aug. 6, 1991, http://www.highbeam.com/doc/1G1-11128400.html.
Bilotta, Caryn, "Understanding Credit Scores," Pittsburgh Post—Gazette, May 9, 2010.
Brown et al., "ALCOD IDSS:Assisting the Australian Stock Market Surveillance Team's Review Process," Applied Artificial Intelligence Journal, Dec. 1, 1996, pp. 625-641.
Cantor, R. and Packer, F., "The Credit Rating Industry," FRBNY Quarterly Review, Summer-Fall, 1994, pp. 1-24.
"Chase Gets Positive," Bank Technology News, May 6, 2000, vol. 14, No. 5, pp. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Chores & Allowances, "Do Kids Have Credit Reports?" Oct. 15, 2007, http://choresandallowances.blogspot.com/2007/10/do-kids-have-credit-reports.html, pp. 5.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html printed Oct. 12, 2012 in 4 pages.
"Cole Taylor Bank Chooses Integrated E-Banking/E-Payments/Reconciliation Solution From Fundtech", Business Wire, Oct. 21, 1999, pp. 2.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
CreditAnalyst, Digital Matrix Systems, as printed out Mar. 4, 2008, pp. 2.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
"Credit Information Bureaus and 'CIBIL'", http://www.icicibank.com/cibil.html printed Aug. 22, 2012 in 3 pages.
CreditKarma: How Credit Karma Works, http://www.creditkarma.com/help/howitworks printed Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Credit Card Management, "Neural Nets Shoot for Jackpot," Dec. 1995, pp. 1-6.
Credit Risk Management Report, Potomac, Mar. 9, 1998, vol. 8, No. 4.
CreditXpert Inc., CreditXpert 3-Bureau Comparison™, 2002, pp. 5, http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View-TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View-TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.

Dash, Julekha, "Java on the Street," Software Magazine, Oct. 1, 1997, vol. 17, No. 11, p. 2.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
Davis, Lisa, "Safety in Numbers," Business North Carolina, Sep. 1, 1995, vol. 15, No. 9, p. 24.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
Dillon et al., "Good Science", Marketing Research: A Magazine of Management & Applications TM, Winter 1997, vol. 9, No. 4; pp. 11.
Downing, Jr.; Richard, "Changes to the Credit Reporting Act," Mortgage Banking, Apr. 1, 1998, vol. 58, No. 7, pp. 82-85.
Ecredable: Discover your AMP Credit Rating™, http://www.ecredable.com/how-it-works/amp-credit-rating printed Oct. 12, 2012 in 2 pages.
EFunds Introduces QualiFileSM, Deluxe Corporation, eFunds Press Release and Product Launch, Sep. 23, 1999, Milwaukee, WI.
Equifax: Consumer Bureau, http://www.equifax.co.in/financial-services/consumer_bureau/en_in#RiskScore printed Oct. 12, 2012 in 3 pages.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Experian, http://www.experian.com/ printed Oct. 12, 2012 in 1 page.
Experian Announces PLUS Score; Experian Press Release dated Oct. 16, 2003; Experian Global Press Office.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian, Custom Strategist and Qualifile from Funds, 2000, in 2 pages.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fair Isaac Corporation, myFICO: Calculators: Credit Assessment, as printed Jun. 8, 2005 in 2 pages, http://www.myfico.com/CreditEducation/Calculators/CreditAssessment.aspx.
Fair Isaac Corporation, myFICO: Help: FICO Score Simulator, as printed Jun. 8, 2005 in 2 pages, http://www.myfico.com/Help/Simulator.aspx?fire=5.
Fair Isaac Corporation, myFICO: Products: Suze Orman's FICO Kit Platinum, as printed Jun. 8, 2005 in 4 pages, http://www.myfico.com/Products/FICOKit/Description.aspx.
Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Products:Suze Orman's FICO® Kit Platinum: Your FICO Score, as printed Jun. 7, 2005 in 1 page, http://www.mvfico.com/Products/FICOKit/Sample01.html.

(56) References Cited

OTHER PUBLICATIONS

Fair Isaac Corporation, myFICO: Sample: FICO Score Simulator, as printed Jun. 8, 2005 in 5 pages, http://www.rnyfico.com/Content/Samples/Sample_ScoreSimulator.asp.
Fair Isaac Corporation, myFICO: Sample: FICO Score Simulator: Max Out All Your Credit Cards, as printed Jun. 8, 2005 in 2 pages, http://www.myfico.com/Content/Samples/Sample_ScoreSimulator-Results.asp?Simulation=4&ReportID=1&productID=&Execute.x=105&Execute.y=23.
Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment= radiobutton&Simulation=2&ReportID=1&ProductID=&Execute.x81&Execute.y=28.
Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.asp?textfieldCC1=750&SelectMonths=1&PayOption=radiobutton&textfieldCC=750&Simulation=3&ReportID=1&ProductID=&Execute.x=57&Execute.y=22.
Fair Isaac Corporation, myFICO: Sample: FICO Score Simulator: Pay Your Bills on Time, as printed Jun. 8, 2005 in 2 pages, http://www.myfico.com/Content/Samples/Sample_ScoreSimulator-Results.asp?select1=1&Simulation=1&ReportID=1&ProductID=&PayBillsOnTime.x=93&PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A=3000&tectfield5B=&textfield5C=&Simulation=5&ReportID=1&ProductID=&NewCredit.x=62&NewCredit.y=20.
Fair Isaac Corporation, myFICO: Sample: FICO Score Simulator: Suggested Best Action, as printed Jun. 8, 2005 in 2 pages, http://www.myfico.com/Content/Samples/Sample_ScoreSimulatorResults.asp?Simulation=111&ReportID=1&ProductID=&TopAction.x=66&TopAction.y=16.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulator-Results.asp?textfield222=5000&Simulation=6&ReportID=1&ProductID=&TransferBalance.x=86&TransferBalance.y=24.
FamilySecure.com; "Identity Theft Protection for the Whole Family | FamilySecure.com" http://www.familysecure.com/, as retrieved on Nov. 5, 2009.
Fickenscher, Lisa, "Merchant American Express Seeks to Mine its Data on Cardholder Spending Patterns," American Banker, vol. 162, Issue 56, Mar. 24, 1997, pp. 1-2.
Financial Engines, http://corp.financialengines.com/ printed Oct. 12, 2012 in 1 page.
Fisher, Joseph, "Access to Fair Credit Reports: Current Practices and Proposed Legislation," American Business Law Journal, Fall 1981, vol. 19, No. 3, p. 319.
Forrest, David, "Achieving Perfect Credit—Lesson 3: Assessing Your Situation," http://www.fool.com/seminars/ev/index.htm?sid=0029&lid=300, 2002, copyright 1995-2002, in 7 pages.
Frank, John, "Scoring Takes on a New Meaning," Credit Card Management, Sep. 1996, vol. 9, No. 6, pp. 155-159.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
GAO-03-661, Best Practices: Improved Knowledge of DOD Service Contracts Could Reveal Significant Savings, GAO, Jun. 2003.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Keeping Tabs on Businesses That Keep Tabs on Us", NewsRoom, The Seattle Times, Section: Scene, Apr. 19, 1995, pp. 4.
Giudici, Paolo, "Bayesian Data Mining, with Application to Benchmarking and Credit Scoring," Applied Stochastic Models in Business and Industry, 2001, vol. 17, pp. 69-81.
"Green Tree Investors May Go To Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Gualtieri et al., "The Forrester Wave™: Big Data Streaming Analytics, QI 2016", Forrester®, Mar. 30, 2016, p. 14, https://www.sas.com/content/dam/SAS/en_us/doc/analystreport/forrester-big-data-streaming-analytics-108218.pdf.
Healy, Thomas J., "The New Science of Borrower Behavior," Mortgage Banking, vol. 58, No. 5, pp. 26-35, Feb. 1, 1998.
Hill, Kerry, "Identity Theft Your Social Security Number Provides Avenue For Thieves", NewsRoom, Wisconsin State Journal, Sep. 13, 1998, pp. 4.
ID Theft Assist, "Do You Know Where Your Child's Credit Is?", Nov. 26, 2007, http://www.idtheftassist.com/pages/story14, pp. 3.
IDEON, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
Instant Access to Credit Reports Now Available Online with DMS' CreditBrowser-based system also Simplifies Credit Decisioning and Offers a Central Point of Control, Business Wire, Dallas, May 23, 2000, p. 0264.
Internal Revenue Service Data Book 2000, Issued Aug. 2001, Revised May 2003.
Jones, Yvonne, "Consumers Understood the Basics but Could Benefit from Targeted Educational Efforts," Gao U.S. Government Accountability Office, Mar. 16, 2005, pp. 128, http://www.gao.gov/products/GAO-05-223.
"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Kulkosky, Edward, "Credit Scoring Appeal Transcends Underwriting," American Banker, vol. 161, No. 93, p. 8, May 15, 1996.
Kuykendall, Lavonne, "Divergent Paths in Early Pacts with Credit Bureaus", American Banker, May 30, 2002, vol. 167, No. 3, pp. 2.
Lan, Joe, "The Top Portfolio Management Software," http://www.aaii.com/computerizedinvesting/article/the-top-portfolio-management-software, Includes Discussion thread, Fourth Quarter 2011, pp. 17.
Lee, W.A., "Experian Eyes Payments, Mulls Deals" American Banker: The Financial Services Daily, 2pgs., New York, NY, May 30, 2003.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
LendingTree.com, "Lender Ratings & Reviews," http://web.archive.org/web/20091015043716/http://www.lendingtree.com/lender-reviews/, Oct. 15, 2009, in 21 pages.

(56) References Cited

OTHER PUBLICATIONS

Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Lifelock, "Identity Theft F.A.Q." http://web.archive.org/web/20080215093614/http://www.identitytheftkiller.com/promo/faq.php, Feb. 15, 2008, pp. 8.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Longo, Tracey, "Managing Money: Your Family Finances", Kiplinger's Personal Finance Magazine, Jun. 1, 1995, vol. 49, No. 6, pp. 4.
Lund, Graham, "Credit Bureau Data: Maximizing the Benefits," Credit Management, May 2004, ProQuest Central, pp. 44-45.
Merriam Webster's Collegiate Dictionary, 10th Edition, 1999, p. 79.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Montgomery County Housing Report, Residential Market Report, Jan. 2004 in 6 pages.
MyFico, http://www.myfico.com/products/ficoone/sample/sample_scoresimulator.aspx printed Oct. 12, 2012 in 3 pages.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New Privista Product Provides Early Warning System to Combat Identity Theft", PR Newswire, Oct. 24, 2000, PR Newswire Association, Inc., New York.
"New for Investors: Asset Allocation, Seasoned Returns and More," Prosper, http://blog.prosper.com/2011/10/27/new-for-investors-asset-allocation-seasoned-returns-and-more/, pp. 4.
Novack, Janet, "The Coming Fight over FICO," Forbes, Dec. 18, 1995, vol. 156, No. 14, p. 96.
Occasional CF Newsletter; http://www.halhelms.com/index.cfm?fuseaction=newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Powerforms: Declarative Client-Side For Field Validation, ISSN 1386-145x, Dec. 2000.
"ProClarity and Microsoft to Host Free Seminar Series on Retail Analytics with Independent Analyst Firm-ProClarity to Share Best Forrester Analysts to Discuss Trends and the Future of the Retail"; Business Wire; p. 2; Aug. 13, 2003.
"Qualifying For Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEERlKk, as published Mar. 21, 2012.
Ratner, Juliana, "GMAC to Sell Risk-Management Advice; Target is 150 Biggest Home Loan Servicers," American Banker, vol. 161, No. 53, p. 16, Mar. 19, 1996.
"Recognition and use by Appraisers of Energy-Performance Benchmarking Tools for Commercial Buildings," prepared by the Institute for Market Transformation, NYSERDA, Feb. 2003, pp. 6.
"Resolve Debt for Less: With Help from Freedom Financial" http://www.debtsettlementusa.com/ printed Jan. 9, 2013 in 6 pages.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+GMAC+UNIT+FOCUSES+ON+PORTFOLIO+RISK-a018092212.
Saunders, A., "Data Goldmine," Management Today, London: Mar. 1, 2004, 6 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
"Shareholders Sue Green Tree Financial," Dated Dec. 4, 1997, http://web.archive.org/web/20000419070107/http://www.wcco.com/news/stories/news-971204-092238.html.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
Steele, Georgia, "Fair, Isaac Seeks Mortgage Tech Opportunities," National Mortgage News, Special Report; B& C Lending, Mar. 23, 1998, p. 34.
Stein, Benchmarking Default Prediction Models: Pitfalls and Remedies in Model Validation, Moody's KMV, Revised Jun. 13, 2002, Technical Report #020305; New York.
Sullivan, Deidre, "Scoring Borrower Risk," Mortgage Banking, Nov. 1994, vol. 55, No. 2, pp. 94-98.
Taylor, Marshall, "Loan-Level Pricing Draws Interest From Investors," Real Estate Finance Today, Jul. 7, 1997, vol. 14, No. 14. p. 10.
"The Best of the Best," Mortgage Technology, Nov. 1, 2003, vol. 10, No. 8, pp. 34-53.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion: VantageScore®—Consistency in Credit Scoring, http://www.transunion.com/personal-credit/credit-reports/vantage-score.page printed Oct. 12, 2012 in 2 pages.
Trulia, "Trulia Estimates," http://www.trulia.com/trulia_estimates/, printed Feb. 18, 2014 in 2 pages.
Tuman, Diane, "What is a Zestimate?" Mar. 2013, pp. 5, http://www.zillow.com/wikipages/What-is-a-Zestimate/.
Vamosi, Robert, "How to Handle ID Fraud's Youngest Victims," Nov. 21, 2008, http://news.cnet.com/8301-10789_3-10105303-57.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Unversiteit Gent (Belgium) 2005.
Wahl, Martin, "The Stampede to Subprime," Mortgage Banking, Oct. 1, 1997, vol. 58, No. 1, p. 26(7).

(56) References Cited

OTHER PUBLICATIONS

Watts, Craig, "Consumers Now Can Know What Loan Rate Offers to Expect Based on Their FICO Credit Score at MyFICO.com," Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
West, David, "Neural Network Credit Scoring Models", Computers & Operations Research, vol. 27, 2000, pp. 1131-1152.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Yang, et al., "An Analysis of the Ex Ante Probabilities of Mortgage Prepayment and Default", Real Estate Economics, Dec. 1998, vol. 26, No. 4, pp. 651-676.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
Zoot—Instant Rules GUI, www.zootweb.com/instant_rules_GUI.html as printed Mar. 3, 2008.
Zoot—Rules Management GUI, www.zootweb.com/business_rules_GUI.html as printed Mar. 3, 2008.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/653,595, dated Aug. 31, 2000.
Apte, et al., "A Probabilistic Estimation Framework for Predictive Modeling Analytics," IBM Systems Journal, 2002, vol. 41, No. 3, pp. 438-448.
"Fraud Alert | Learn How". Fight Identity Theft. http://www.fightidentitytheft.com/flag.html, accessed on Nov. 5, 2009.
Langer et al., "Creditor List Screening Practices: Certain Implications Under the Fair Credit Reporting Act and the Equal Credit Opportunity Act," The Business Lawyer, May 1988, vol. 43, pp. 1123-1141.
Lifelock, "LifeLock Launches First ID Theft Prevention Program for the Protection of Children," Press Release, Oct. 14, 2005, http://www.lifelock.com/about-us/press-room/2005-pressreleases/lifelock-protection-for-children.
Lifelock, "Personal Identity Theft Protection & Identity Theft Products," http://www.lifelock.com/lifelock-for-people, accessed Nov. 5, 2007.
Lifelock, Various Pages, www.lifelock.com/, 2007.
"NewsHound: NewsHound User Guide Internet E-Mail", of record as early as May 2, 1997, pp. 11.
"Normalize," http://www.merriam-webster.com/dictionary/normalize printed Jun. 14, 2010.
Sealey, Geraldine, "Child ID Theft Can Go Unnoticed for Years", http://abcnews.com/US/story?id:90257, Sep. 12, 2003 in 9 pages.
TheMorningCall.Com, "Cheap Ways to Foil Identity Theft," www.mcall.com/business/columnists/all-karp.5920748jul01.0 . . . , published Jul. 1, 2007.
Todorova, Aleksandra, "Protecting Your Child's Identity", Smart Money, Published Aug. 2, 2007, pp. 1-5.
"Use of Alternative Data to Enhance Credit Reporting to Enable Access to Digital Financial Services by Individuals and SMEs Operating in the Informal Economy", Guidance Note, International Committee on Credit Reporting (ICCR), Jun. 28, 2018, pp. 35.
International Search Report and Written Opinion for Application No. PCT/US2018/016258, dated May 16, 2018.
International Preliminary Report on Patentability in Application No. PCT/US2018/016258, dated Aug. 15, 2019.
International Search Report and Written Opinion for Application No. PCT/US2018/061877, dated Mar. 8, 2019.
Gopalan, R., "Panning for Sales-Force Gold", Intelligent Enterprise, Dec. 21, 1999, vol. 2, No. 18, pp. 39-43.
International Search Report and Written Opinion for Application No. PCT/US2019/049377, dated Dec. 20, 2019.
Menge, Falko, "Enterprise Service Bus", Free and Open Source Software Conference, 2007, pp. 6.
Schmidt, David, "Environmental Impact: The Changing Credit Reporting Landscape," Business Credit, Apr. 2003, vol. 105, No. 4, pp. 14 (electronic copy provided in 5 pages).
International Preliminary Report on Patentability in Application No. PCT/US2018/061877, dated Jun. 4, 2020.
Agarwal et al., "Determinants of Credit Card Delinquency and Bankruptcy: Macroeconomic Factors", Journal of Economics and Finance, 2003, vol. 27, pp. 75-84 (12 pages).
Credit Scoring Systems Used To Measure Bankruptcy Risk. (1991). Credit Risk Management Report, 1(2), N/A. Retrieved from https://dialog.proquest.com/professional/docview/1078503725?accountid=131444, pp. 7.
Nikravesh et al., "Fuzzy Queries, Search, and Decision Support System", Soft Computing, Aug. 2002, vol. 6, No. 5, pp. 373-399.
Ralston et al., "Lending Procedures and the Viability-Social Objectives Conflict in Credit Unions", The International Journal of Bank Marketing, 2003, vol. 21, No. 6/7, pp. 304-311 (14 pages).
Solapurkar, Prajakta, "Building Secure Healthcare Services Using OAuth 2.0 and JSON Web Token in IOT Cloud Scenario", IEEE, 2nd International Conference on Contemporary Computing and Informatics (ic3i), 2016, pp. 99-104.

* cited by examiner

| Name | Address | ... | Personal Identifiers | Access Code 1 | Access Code 2 | User Preferences |
|---|---|---|---|---|---|---|
| Smith, Joe | 111 1st Ave | | PID: 9483904991 Fingerprint: file.xyz Login/Password | 32124567 | 7940384 | Inquiry alerts when locked -- ON -requesting entity in alert -- ON Unlock time period -- 5 mins. Unlock only for requesting entity -- ON ... |

FIGURE 5D
FIGURE 5E
FIGURE 5F

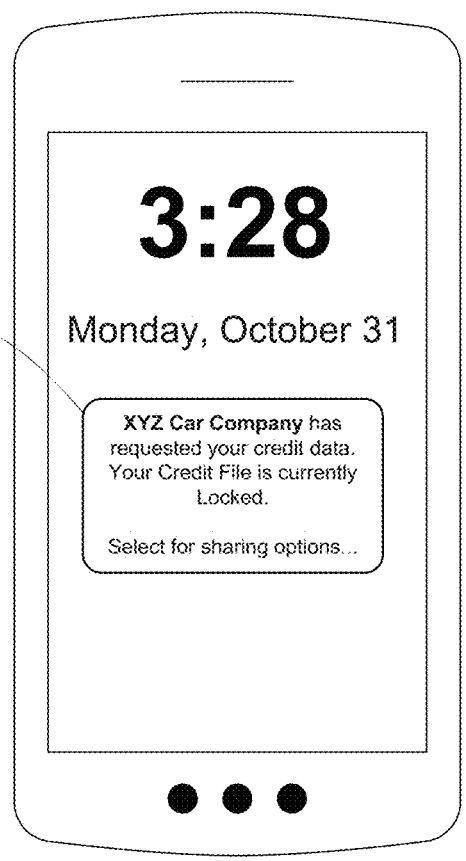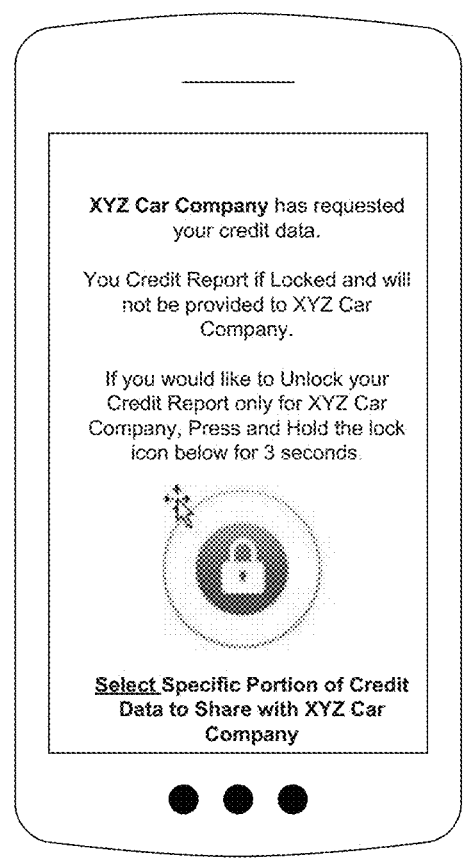
FIGURE 7A                    FIGURE 7B

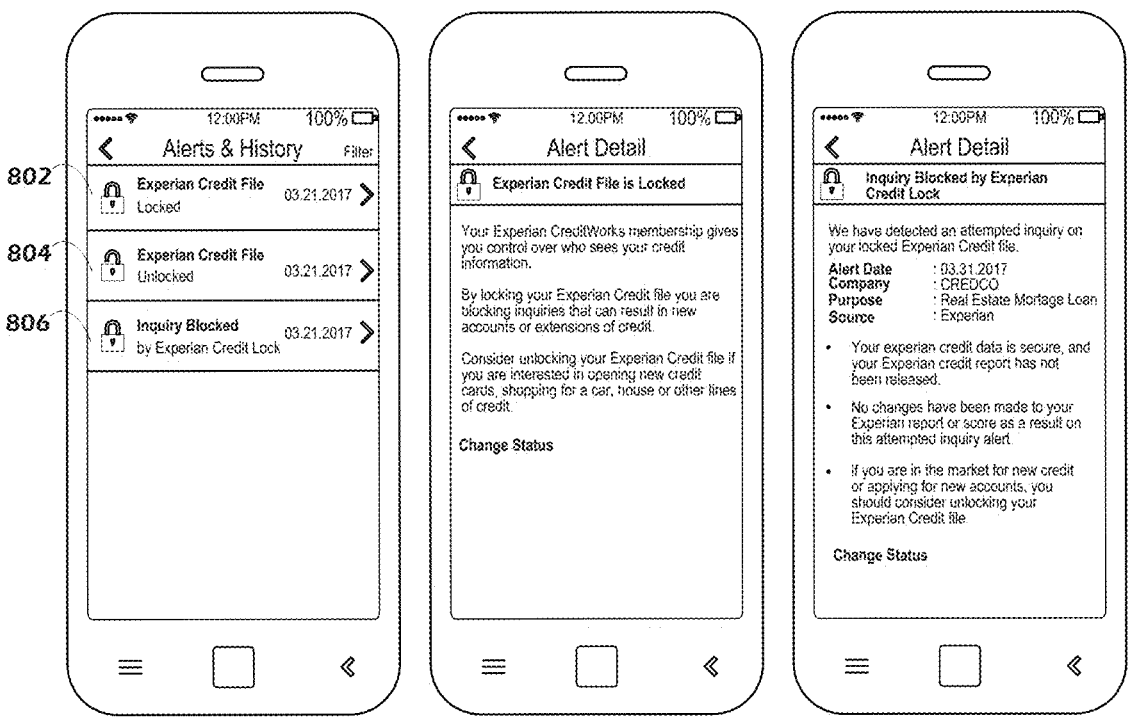

REALTIME ACCESS AND CONTROL OF SECURE REGULATED DATA

CROSS REFERENCE TO RELATED APPLICATIONS

This application claims the benefit of priority under 35 U.S.C. § 119(e) of U.S. Provisional Application No. 62/256,634, filed on Nov. 17, 2015 and titled COMPUTER SYSTEM AND INTERACTIVE USER INTERFACES FOR REAL TIME ACCESS AND CONTROL OF REMOTE DATA, the entirety of which is incorporated herein by reference.

BACKGROUND

Credit bureaus may provide users with the ability to limit access to the user's credit data, such as though completion of forms and manually providing identification information (e.g., birth certificate, passport, etc.). User's may have the ability to request access restrictions on credit data, such as via a lock or unlock, or freeze or unfreeze. When a credit file is unlocked, for example, information in the file can be accessed by third parties that have a permissible purpose to access the user's credit data, such as under the Fair Credit Reporting Act (FCRA) in the United States.

Typically, a user provides information to a credit bureau that confirms their identity, as well as possibly a lock/unlock identifier (e.g., a number or alphanumeric code) in order to initiate locking or unlocking of their credit file. Unfortunately, this can be a tedious, slow, and inconvenient process for many reasons. For example, the process may be quite slow as it may require human review of the authentication documents. There may also need to be several layers of security features to authenticate the user, such as providing original copies of documents (e.g., birth certificates, passports, etc.), biometric sensors, passwords and pins, and/or responding to questions. The user would also have to remember such passwords and pins, and responses to the answers. The forms or process of locking or unlocking may also be long and require a lot of information from the user. The forms may also require documents that may take time and effort to obtain (e.g. bank statement, utility bill, etc.). Furthermore, the lock or unlock feature may require a fee or payment from the user each and every time a lock or unlock request is sent. Also, sending and receiving information for such a request over the phone, via mail or electronically, may subject such information to security risks (e.g. hacking) and may lead to more identity theft or fraud. The rules for a freeze and unfreeze may also differ from state to state, further complicating the process of securing user data. Thus, when moving from one state to another, the rules for locking and unlocking your credit file may be quite different.

In view of these technological shortcomings, when a user wishes to provide a third party with access to credit data that is locked, they cannot do so. Additionally, users may forget that they locked their file and when applying for credit (or otherwise wanting to allow access to credit data), would simply be prevented from accessing their credit file until the arduous and time-consuming process of unlocking the credit data is performed. Users would have to identify what happened (e.g. whether the credit file was locked/frozen or some other reason such as incorrect information submitted) and take necessary steps to release the credit file that prolong the process and may dissuade a user from continuing.

Additionally, users have no control over their credit files once a lock is performed. For example, after a lock has been placed, the user is unaware of credit inquiries (requests by third parties to access credit data) received by the credit bureaus and, thus, cannot provide access to third parties that the user wishes to grant access to. For example, although the user may have locked their credit file for other security purposes (such as identify theft), the user may need to allow access their credit file for other purposes (such as applying for a credit card). However, based on the technological shortcomings noted above, the user may decide not to pursue the credit card. Moreover, after completing the arduous process of unlocking their credit file, the user may forget or just not be dedicated enough to spend the time on the similar process of re-locking their credit file.

Users may also find it inconvenient to have to memorize a separate identifier that is provided by the credit bureau for each credit bureau that maintains a credit file for the user. Moreover, the user may forget an identifier he or she may need to request a new identifier by, for example, phone or certified mail from the credit bureau, which can result in a delay in locking their file. Additionally, when the user wishes to unlock their file they may need to wait a specified period of time, often three days, for the file to be unlocked. Besides imposing risks to a user's credit file, these delays may cause lenders, such as those looking to provide instant credit, to lose out on credit opportunities. Furthermore, users may not want to reveal their identifiers in a public area at the point of sale.

In merchant environments, such as department stores, credit file locking and unlocking can be especially problematic. For example, a store may offer a credit card, debit card, or store loyalty card, for example, to a user at a point of sale. The user may decide that applying for the store card is not worthwhile because their credit file is locked and unlocking the file will take significant time and effort (e.g., the user may be required to call each of one or more credit bureaus and provide credit bureau specific credit file unlock codes to each credit bureau, pay a fee to each of the credit bureaus, etc., and waiting significant time periods for implementation by respective credit bureaus). Alternatively, a user may apply for the store card using the credit application process, only to discover that their credit file is locked. In this situation, the user may then decide not to proceed further with the application process because of the above-noted technological shortcomings in existing credit file control systems. As a result, merchants may lose out on significant sales and credit opportunities.

SUMMARY

The systems and methods described herein allow users to control access to regulated data of the user (stored in a secured third party database) through interaction on a mobile device (or other computing device), such as to provide a touch gesture on the mobile device that causes the users regulated data to be accessible to a third party. The regulated data may include credit data of the user, such as a credit report or credit file. Access rights to the regulated data may be provided in real-time (or near real-time) in response to a request for the data from a third party, for example. The system may allow a user to respond to an alert or notification that is automatically sent to the computing device of the user in response to a request for a secure regulated data of the user.

In one embodiment, the regulated data comprises credit data that is stored by one or more credit bureaus and the access control include locking and unlocking of credit data specific to a user. In some embodiments, systems and methods described herein allow users to unlock their credit files in real-time or near real-time. Upon receiving a request to access a credit file from a requesting entity, the system may determine whether the credit file is locked, frozen, or otherwise prevented from dissemination. In response to determining that the credit file is not locked, frozen, or otherwise prevented from dissemination, the system may proceed with the release of credit data. However, if the credit file cannot be sent to the requesting entity, the system may notify the user. The system may determine notification preferences of the user and transmit an alert according to such preferences. The alert may notify the user that an inquiry to the credit file has been sent.

In some embodiments, the system may authorize an unlock, unfreeze, thaw, or lift of the credit file. U.S. Pat. No. 9,256,904, titled "Multi-bureau credit file freeze and unfreeze," issued Feb. 9, 2016, which is hereby incorporated by reference in its entirety, describes additional details and options in allowing users to lock or unlock their credit files, such as through use of a personal identifier. The features and details included in U.S. Pat. No. 9,256,904 may be applied to various embodiments discussed herein.

In some embodiments, the system performs credit file locking and unlocking based on user, system, or group defined preferences. For example, in some embodiments, the credit file may be unlocked for a particular period of time. The credit file may also be unlocked for a purpose or for a particular requesting entity. The unlock may be toward a portion or subset of the credit file while a lock remains on the remainder of the credit file. U.S. Pat. No. 8,744,956, titled "Systems and methods for permission arbitrated transaction services," issued Jun. 3, 2014, describes additional details and options associated with selective sharing of credit data, such as sharing for a period of time or purpose. The features and details included in U.S. Pat. No. 8,744,956 may be applied to various of the embodiments discussed herein.

Embodiments of the present disclosure may be particularly advantageous in merchant environments. For example, in point of sale environments a user may apply for a credit card (debit card, store loyalty card, or other account that requires access to credit data by the merchant). However, the credit file may be locked. In response to the merchant's inquiry for credit information, the system can automatically and in real-time generate and transmit alert data to a mobile device of the user, notifying the user of the inquiry and possibly provided a link to additional information regarding the user's credit data, the requesting merchant, or other relevant information. Then the system can allow the user to authorize an unlock of the credit file. The unlock can be customized. For example, the credit file may be unlocked for a particular purpose (e.g. applying for a credit card or more generally for a line of credit). The unlock may be for a particular duration (such as an unlock for an hour) and then may automatically re-lock thereafter. The unlock may be for a particular requesting entity (e.g. a trusted merchant identified by the user). The unlock may be directed toward a portion of the credit data. For example, a portion of the credit data that is necessary for the purpose of the inquiry may be released. A less intrusive portion of the credit file may also be released (e.g. such as credit score without total debt). By providing users with a simplified interface and an expedient mechanism for customized unlocking of their credit files, the system can increase credit opportunities for both the user and the merchant, while reducing risk of identity theft by allowing the user to easily keep their credit file locked.

Furthermore, the present disclosure is advantageous in security environments. For example, the user may apply a lock on their credit file. However, the user may want to know who is inquiring about their credit data while their account is locked. The user may be watching television at home when the user's mobile device notifies the user that a particular foreign company has tried to inquire about the user's credit data. The user may then keep the lock on their credit file and notify other third parties of the inquiry to begin an investigation. The same user can still unlock their credit files for other purposes (e.g. their trusted bank requested credit information to see if they can automatically increase the user's credit card limit).

In some embodiments, access exceptions may apply and thus credit data may nevertheless be released regardless of whether there is a lock or a freeze on the account. An access exception applies when credit data is provided regardless of whether the user's credit data is locked or frozen. For example, federal, state, and local government agencies have access to credit data in some circumstances (e.g. in support of a child support claim).

BRIEF DESCRIPTION OF THE DRAWINGS

FIG. 3 is a diagram illustrating one embodiment of a user lock status & preferences data structure.

FIGS. 5A-5F are user interfaces illustrating one embodiment for requesting an unlock of the credit file.

FIGS. 7A-7B are user interfaces illustrating one embodiment for an alert on a mobile phone that allows the user to authorize an unlock.

FIGS. 8A-8C are user interfaces illustrating one embodiment for showing a history for a credit file.

Figure 1:
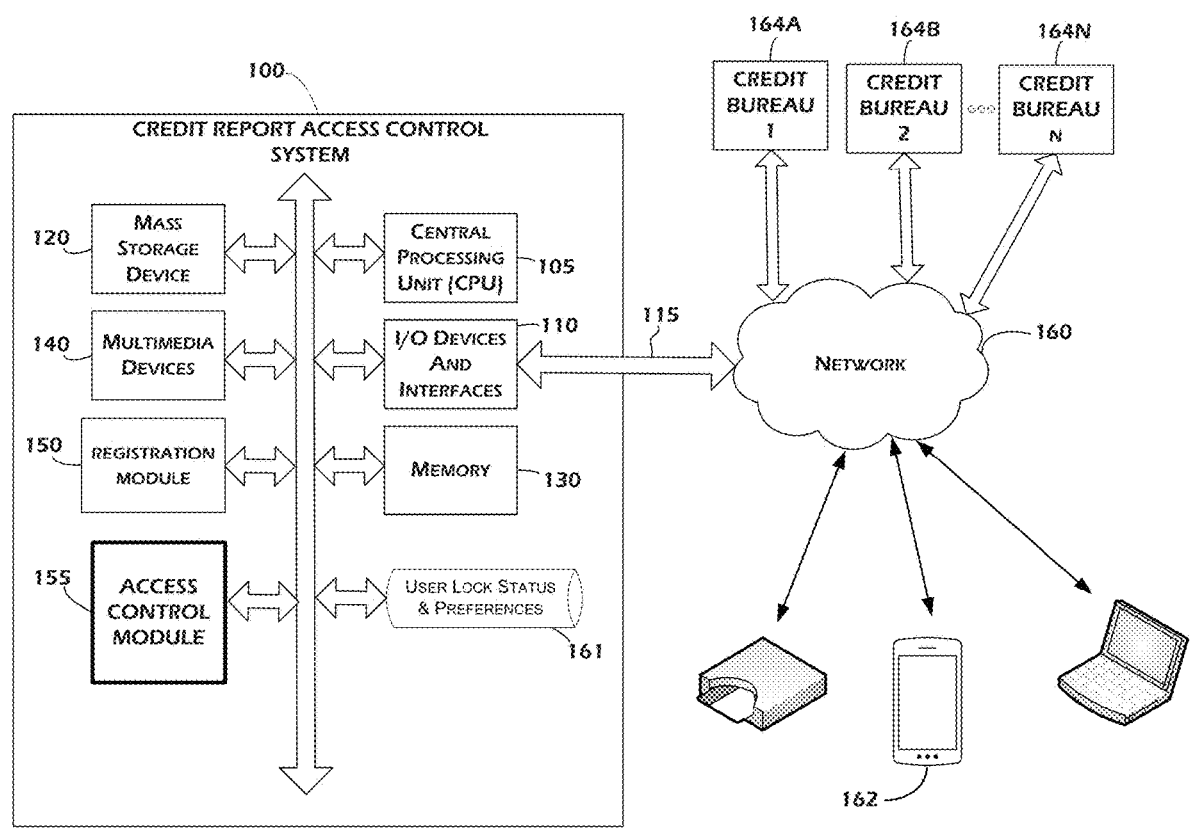
FIG. 1 is a block diagram illustrating one embodiment of a credit report access control system that is in communication with a user computing device and a plurality of credit bureaus via a network.

These and other features will now be described with reference to the drawings summarized above. The drawings and the associated descriptions are provided to illustrate certain embodiments and not to limit the scope of the invention. Throughout the drawings, reference numbers may be re-used to indicate correspondence between referenced elements.

DETAILED DESCRIPTION

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

The terms "user," "individual," "consumer," and "customer" should be interpreted to include single persons, as well as groups of individuals, such as, for example, married couples or domestic partners, organizations, groups, and business entities. Additionally, the terms may be used interchangeably. In some embodiments, the terms refer to a computing device of a user rather than, or in addition to, an actual human operator of the computing device.

User Input (also referred to as "Input") generally refers to any type of input provided by a user that is intended to be received and/or stored by one or more computing devices, to cause an update to data that is displayed, and/or to cause an update to the way that data is displayed. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like.

Credit data generally refers to user data that is collected and maintained by one or more credit bureaus (e.g., Experian, TransUnion, and Equifax) and is subject to regulatory requirements that limit, for example, sharing of credit data to requesting entities based on the Fair Credit Reporting Act (FCRA) regulations in the United States and/or other similar federal regulations. "Regulated data," as used herein, often refers to credit data as an example of such regulated data. However, regulated data may include other types of data, such as HIPPA regulated medical data. Credit data can describe each individual data item associated with a user, e.g., an account balance, or any combination of the individual's data items. "Credit file" and "credit report" generally refer to a collection of credit data associated with a user, such as may be provided to the user, to a requesting entity that the user has authorized to access the user's credit data, or to a requesting entity that has a permissible purpose (e.g., under the FCRA) to access the users credit data without the user's authorization.

A credit report freeze (also referred to herein as a "credit freeze," "report freeze," a "freeze," or the like) generally refers to blocking access to a user's credit data by third parties (e.g., someone or an entity other than the user associated with the credit data), such as credit data in a credit file or credit report. A credit report freeze is often executed in accordance with various security freeze laws. For example, a credit report freeze may be implemented in view of a single state's law to enact security freezes. A credit report freeze may require an individual to provide a personal identification (PIN) code and/or other authentication information (username and password, biometric data, etc.) to initiate the freeze. In some embodiments, state-regulated fees and or credit bureau fees may be charged to the user that requests a credit freeze. When a user's credit report is frozen, certain accesses to the user's credit data that are typically permissible, such as for pre-qualification of the user for a line of credit, may be blocked. In some embodiments, user initiated credit monitoring may or may not be allowed if the user's credit report is frozen. A credit freeze can prevent thieves and data hackers from accessing credit information A credit report lock (also referred to herein as a "credit lock," "report lock", "lock," or the like) generally refers to blocking access to credit data of a user associated with the credit data. A credit report unlock (also referred to herein as a "credit unlock lock," "report unlock", "unlock," or the like) generally refers to allowing access to credit data that has previously been locked. A credit lock can allow customization beyond what is allowed with a credit freeze, such as to allow the user to proactively control accesses to their credit data, such as through authorizing access to only a particular entity, for a limited time period, etc., as discussed herein. A credit lock is generally implemented by one or more credit bureaus and, thus, may not be limited by government regulations, such as those that apply to a credit freeze. Advantageously, a credit report lock may prevent access to only particular items of credit data within a credit file of a user. The user's proactive controls may include blocking credit inquiry requests from only a certain entity or entities and, similarly, may allow access to credit data from only a certain entity or entities. A credit report lock may be for a particular period of time, such as a temporary lift (e.g., 1 hour) on the credit report lock, or purpose. While much of the description herein refers to a credit report lock and unlock, similar functionality and advantages can equally be applied to credit report freezes, lifts, and thaws, and vice versa.

An access exception generally refers to an exception for providing credit data of a user regardless of whether the user's credit data is locked and/or frozen. For example, federal, state, and local government agencies may receive an access exception such that their requests for credit data of a user are not blocked by the user's credit file being locked. Such government requests may be to retrieve user information in support of a child support claim, for example. Another access exception may be to companies requesting credit data for the purposes of employment of a user or to insurance companies for determining whether to insure a user. Companies that already have a pre-existing relationship with a user (e.g. the user has an open account with the company included on the user's credit report, collection agencies acting on behalf of those whom you owe for the purposes of reviewing the credit report) may also be allowed an access exception. Companies that may be able to offer prequalified offers of services may also have an access exception. In some embodiments, however, the user is able to specifically indicate to the access control system that such prequalification services are not to be provided access to the user's credit file and effectively override any access exceptions that such a prequalification service may otherwise have. Similar overrides to other access exceptions are also possible in various embodiments. Also, users requesting direct credit monitoring, credit reports, or credit scores from credit bureaus may also have an access exception. The examples are not meant to limit the definition but only to provide examples of the term.

In various embodiments discussed herein, alerts and/or notifications (which may be used interchangeably) are automatically transmitted to a device operated by the user whose credit data has been requested. The alert and/or notification can be transmitted at the time that the alert and/or notification is generated or at some determined time after generation of the alert and/or notification. When received by the user's device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a credit monitoring application provided to the user by the credit report access control system), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet. The alert and/or notification may be determined based on preferences stored in a data store. For example, a user may sign up for a publish/subscribe service or a credit monitoring service that may be configured to identify changes to credit data. Upon enrollment, the individual may additionally select an option to be notified of credit data inquiries and a selection of preferences for receiving alerts/notifications (e.g., as discussed with reference to block 425 of FIG. 4 below).

A module generally refers to logic embodied in hardware or firmware, or to a collection of software instructions, possibly having entry and exit points, written in a programming language, such as, for example, Java, Lua, C, C++, or C #. A software module may be compiled and linked into an executable program, installed in a dynamic link library, or may be written in an interpreted programming language such as, for example, BASIC, Perl, or Python. Software modules may include, by way of example, components, such as class components and task components, processes, functions, attributes, procedures, subroutines, segments of program code, drivers, firmware, microcode, circuitry, data, databases, tables, arrays, and variables. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage. When executed by the credit report access control system 100, modules may allow the credit report access control system 100 to perform operations, such as storing data, accessing stored data, modifying stored data, communicating with other computing devices and systems, and other operations described herein. For ease of explanation, the modules may be referred to as performing an operation or a method, even though other systems and/or components of the credit report access control system 100 may actually perform the operation or method in response to executing software of a module, for example.

Example Workflow and Advantages

The present disclosure generally relates to credit file locking and unlocking. The service may allow a user to respond to an alert sent in response to a request for a locked credit file. The system may authorize an unlock, unfreeze, thaw, or lift of the credit file. In one embodiment, a system that implements a credit file locking service is disclosed. In contrast to existing frameworks where credit files of users are locked or unlocked through a laborious process, not providing the user with the various proactive controls noted herein, the systems and methods described herein allow users to selectively authorize access to their credit data even after the credit file has been locked or frozen. Additionally, the user access controls and customizations discussed herein with reference to credit locking and unlocking may also be used with a fraud alert. In one embodiment, if a fraud alert is placed on a user's credit file, each time a third party, for example a merchant, requests access to the user's locked credit file, a credit bureau sends notice to the requesting third party that the third party should take steps to verify the identity of the party requesting credit prior to extending credit in the name of the user on the requested credit report. For example, the user may be contacted with a request for permission to allow the third party to access the credit file for purposes of determining eligibility for a credit account, for example.

In an illustrative embodiment, a user may provide one or more personal identifier (also referred to herein as "PID") to a report access control system, for example over a computer network. As used herein, a PID may comprise any personal identifier, including without limitation a login ID and password, a name, an address, a phone number, a date of birth, a maiden name, a social security number, an account number, a driver's license number, a password, a RFID tag or token, biometric data, such as a fingerprint, and/or a personal identification number (also referred to herein as a "PIN" or a PIN code"), which may comprise a sequence of numerals, a sequence of alphanumeric characters, or any combination of personal identifiers. A user selected PID may indicate that the user has selected the type of data in the PID (e.g., a user selects a PID that is a password, a PIN, or a fingerprint) and/or that the user has selected the content of the PID (e.g., the user selects the particular password or PIN or provides a fingerprint). A user selected PID may advantageously be easier for the user to remember and/or provide to a requesting entity or device.

A user may provide the PID using a computing device, such as, for example, a mobile device, a keypad, a card reader, or a biometric data reader. A report access control system may then validate the identity of the user using the PID provided. After verifying the identity of the user, the report access control system may initiate unlocking or locking of the user's credit files at each of a plurality of credit bureaus. In one embodiment, the credit files may be unlocked or locked for a predetermined period of time, and the predetermined period of time may be specified by the user.

Some embodiments of the systems and methods described herein may allow merchants to increase credit opportunities, especially in point of sale environments. For example, a merchant can request a user to enter a PID, such as a PIN code, into a keypad (e.g., a credit card reader keypad). After the user enters a PID, the merchant can request a credit file. In other embodiments, the PID is sent directly to the credit bureau, access control system, or the like such that the merchant does not have access to the PIDs, preserving security of the PID. For example, a user interface and API from the access control system may be provided via the merchants POS terminal (e.g. a card reader and keypad at checkout) so that information provided by the user to unlock the user's credit file, such as a PID, is transmitted directly to the access control system without allowing the merchant to store the PID.

If a user's credit file is locked when a merchant requests access, the merchant will be denied access to the credit file. Advantageously, in response to such an access request, the access control system discussed herein can send a real-time alert to the user allowing the user to unlock the credit file and/or a user's preferences may allow the credit file to unlock. The user may be able to quickly and easily lock or unlock their credit files after the desired credit pulls have occurred by entry of their PID. Thus, the system may increase credit opportunities for merchants and other financial service providers of mortgages, automobile loans, credit card accounts, and the like by allowing them to access credit files quickly.

Various embodiments discussed herein include details regarding specific implementations of an access control system, including interactive user interfaces that improve the functioning of the basic display function of the computer itself. These interactive user interfaces improve the ability of the computer to display information and interact with the user, such as by allowing a user to quickly and easily provide access to credit data. Design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, a credit report access control system.

Example System Architecture

FIG. 1 is a block diagram illustrating one embodiment of a credit report access control system 100 that is in communication with a user computing device 162 and a plurality of credit bureaus 164 (including credit bureaus 164A, 164B, 164N that are representative of any quantity of credit bureaus) via a network 160. Generally, the credit bureaus 164 comprise one or more computing systems that gather and make available information about how users use credit, such as a credit score or credit report, for example.

The computing device 162 may be associated with any user, such as an individual consumer, a retailer, an account provider, etc. The user computing device 162 may comprise one or more computing system, mobile device, keypad, card reader, biometric data reader, or other device that allows a user, such as a user, merchant, bank, etc., to exchange information with the credit report access control system 100. In particular, the user computing device 162 may allow the user to interface with the system 100 in managing access to the user's credit data. In addition, the user computing device 162 may allow the user to unlock or lock credit files at multiple credit bureaus by communicating with the credit report access control system 100. In a merchant environment, such as a department store, the computing device 162 may include a keypad, such as a keypad associated with a credit card reader at a store checkout, that allows a user to enter in information to unlock (or lock) their credit files at the plurality of credit bureaus 164 nearly instantaneously and using a simplified process.

The credit report access control system 100 may be used to implement certain systems and methods described herein. For example, in one embodiment the credit report access control system 100 may be configured to implement a credit file freeze or lock and/or a credit file thaw or unlock process. The functionality provided for in the components and modules of the credit report access control system 100 may be combined into fewer components and modules or further separated into additional components and modules. The various computing components and functionality described herein with reference to the system 100 may also be included in any of the discussed user computing devices 162.

The credit report access control system 100 may include, for example, a computing system, such as a computing device that is IBM, Macintosh, or Linux/Unix compatible. In one embodiment, the computing device comprises one or more servers, desktop computers, laptop computers, cell phones, personal digital assistants, and/or kiosks, for example. In one embodiment, the credit report access control system 100 include a central processing unit ("CPU") 105, which may include one or more conventional microprocessors. The credit report access control system 100 may further include a memory 130, such as random access memory ("RAM"), a flash memory, and/or a read only memory ("ROM"), and a mass storage device 120, such as one or more hard drives, diskettes, and/or optical media storage devices. Typically, the components and modules of the credit report access control system 100 are connected using a standards based bus system. In different embodiments, the standards based bus system could be Peripheral Component Interconnect (PCI), Microchannel, Small Computer System Interface (SCSI), Industrial Standard Architecture (ISA) and Extended ISA (EISA) architectures, for example.

The credit report access control system 100 is generally controlled and coordinated by operating system software, such as Windows 95, Windows 98, Windows NT, Windows 2000, Windows XP, Windows Vista, Windows 7, Linux, SunOS, Solaris, or other compatible operating systems. In Macintosh systems, the operating system may be any available operating system, such as MAC OS X. In other embodiments, the credit report access control system 100 may be controlled by a proprietary operating system. Conventional operating systems control and schedule computer processes for execution, perform memory management, provide file system, networking, and I/O services, and provide a user interface, such as a graphical user interface ("GUI"), among other things.

The illustrative credit report access control system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The credit report access control system 100 may also include one or more multimedia devices 140, such as speakers, video cards, graphics accelerators, and microphones, for example.

In the embodiments of FIG. 1, the I/O devices and interfaces 110 provide a communication interface to various external devices. In the embodiments of FIG. 1, the credit report access control system 100 is coupled to a network 160 that comprises any combination of one or more of a LAN, WAN, or the Internet, for example, via a wired, wireless, or combination of wired and wireless, communication link 115. The network 160 communicates with various computing devices and/or other electronic devices via wired or wireless communication links.

In the illustrative embodiments of FIG. 1, the credit report access control system 100 includes, or may be coupled to, for example via a network connection, a device that includes a user lock status & preferences data structure 161. The user lock status & preferences data structure 161 may include lock or unlock information that associates users with respective access codes for locking and/or unlocking the user's credit files at each of a plurality of credit bureaus. The user lock status & preferences data structure 161 may be implemented in any suitable format, including objects, tables, arrays, hash tables, linked lists, and/or trees. The user lock status & preferences data structure 161 may be implemented and stored in a database. As used herein, a database may comprise a relational database, such as Sybase, Oracle, CodeBase and Microsoft® SQL Server as well as other types of databases such as, for example, a flat file database, an entity-relationship database, an object-oriented database, and/or a record-based database. The data structure 161 may be stored in any computer readable medium, including a hard drive, a random-access memory, an optical disc, a tape drive, and/or a diskette.

The information stored by the user lock status & preferences data structure 161 may include a user personal identifier ("PID") that may be selected by a user. In one embodiment, the user PID is associated with multiple credit bureau specific access codes that are associated with the user's credit file at respective credit bureaus and that are configured to initiate locking or unlocking (and/or other access control operations) of the user's credit files at the respective credit bureaus 164. In addition to the components and devices that are illustrated in FIG. 1, the credit report access control system 100 may be connected to other data structures that store access codes for user credit files and/or other computing devices through a bus or network 160.

The user lock status & preferences data structure 161 may include user lock status of the credit file. For example, the data structure 161 may include data identifying whether a credit file is frozen, unfrozen, locked, unlocked, thawed, and/or other access controls that the user has requested for the user's credit file. As noted above, a "credit file" and/or "credit data" may refer to an entire credit file of a user, a portion of the credit file, credit data, financial or transactional data, personal data, and/or other data related to an individual.

In some embodiments, the user lock status & preferences data structure 161 may store preferences. A user preference may include a preference on actions to take upon an inquiry for a credit file while the credit file is locked. For example, preferences may include whether an alert is sent to the user regarding a credit data request. Preferences may also include the type of information to include in such an alert. Preferences may also include whether an option to unlock the credit data should be included in the alert, and/or may include an automatic unlock of the credit file. The unlock may be customized (e.g. for a particular period of time, for a particular requesting entity, for a portion of the credit file). The preferences may be a default preference, may be inputted by the user, or may be determined based on other relevant circumstances. FIG. 3, discussed in further detail below, includes an example of a portion of such as user lock status & preferences data structure 161.

In the embodiment of FIG. 1, the credit report access control system 100 also include application modules that may be executed by the CPU 105. In the example embodiment of FIG. 1, the application modules include the registration module 150 and the access control module 155, which are discussed in further detail below. In the embodiments described herein, the credit report access control system 100 is configured to execute the registration module 150, among other modules, to create a single point of service for users to lock, unlock, or apply further custom access controls on their credit files at multiple credit bureaus 164A-N. For example, in one embodiment, the registration module 150 allows a user to set up the file locking service by creating an account. The registration module 150 may request a user to provide enrollment information, including information that verifies their identity, such as a name, driver's license number, address, social security number, birth date, phone number, account number, and the like. The registration module 150 may then request the user to select a user PID. When the user PID is later provided to the credit report access control system 100, the credit report access control system 100 may initiate locking or unlocking of credit files of the user at a plurality of credit bureaus 164A-N using access codes associated with the user's credit files at respective credit bureaus.

The registration module 150 may further be configured to send requests to the plurality of credit bureaus 164 to obtain access codes and/or other information about unlocking or locking credit files of a registering user. In one embodiment, the registration module 150 may automatically register the user at the plurality of credit bureaus 164 and receive the respective access codes for locking/unlocking the user's credit files at those credit bureaus 164. In one embodiment, an access code authenticates the identity of the user at a particular credit bureau for credit file locking or unlocking. The registration module 150 may store these credit bureau specific access codes in the user lock status & preference data structure 161 and associate some or all of the credit bureau specific access codes of a user with the user PID of the user.

The credit report access control system 100 may also execute the access control module 155 to provide a simplified mechanism or interface to lock or unlock credit files at the plurality of credit bureaus 164A-N. In one embodiment, the access control module 155 can receive a user PID that is inputted by a user from user computing device 162, or other device. After receiving the user PID, the access control module 155 may access the user lock status & preferences data structure 161 to translate the received user PID into access codes corresponding to multiple respective credit bureaus. The access codes may then be sent over the network 160 to corresponding respective credit bureaus 164 to lock or unlock one or more credit files of the user.

In some embodiments, when the credit report access control system 100 is operated or associated with one or more of the credit bureaus 164, the user PID may be used to lock or unlock credit files without any translation. This may be particularly advantageous in reducing processing time that may otherwise be expended to translate a user PID into lock or unlock information.

Figure 2:
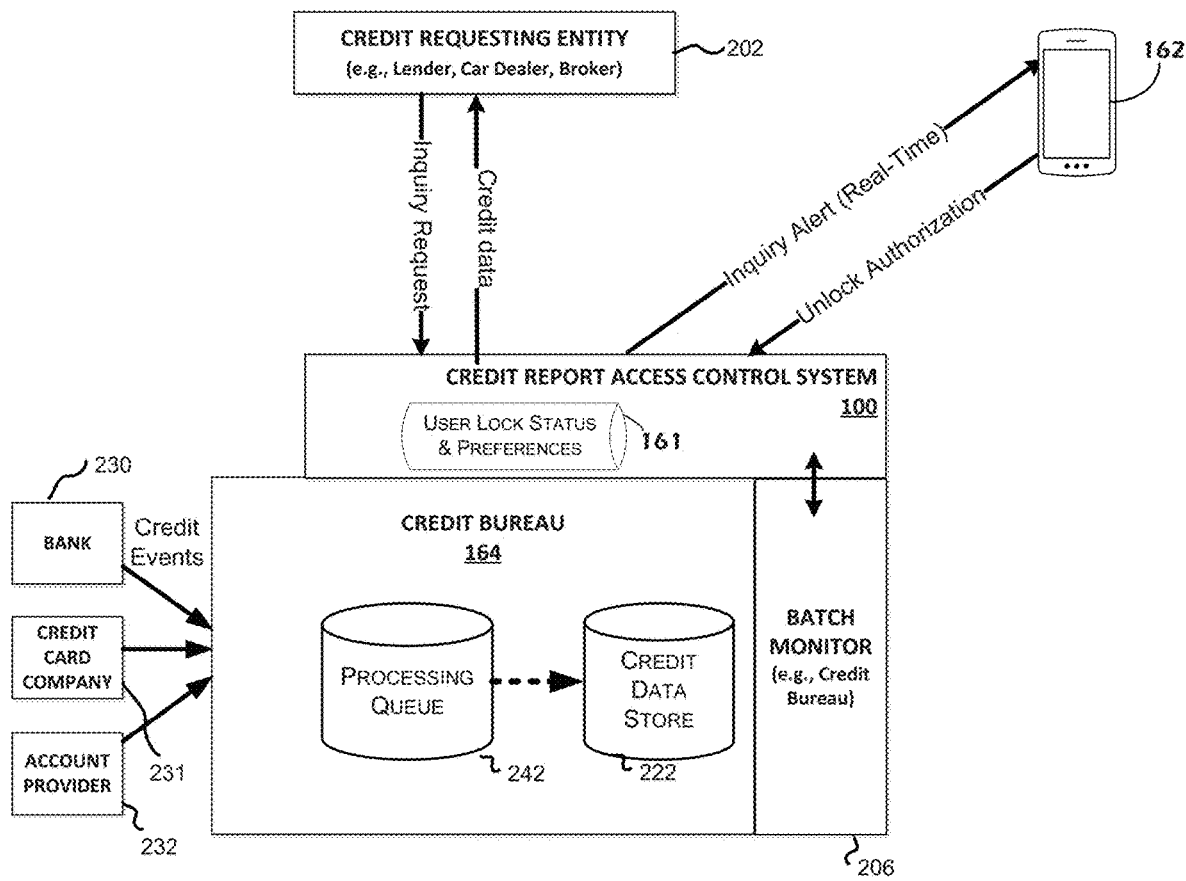
FIG. 2 is a block diagram illustrating an example configuration of a system that provides real-time user alerts in response to credit inquiry requests with unlock authorization.

FIG. 2 is a block diagram illustrating an example configuration of a system that provides real-time user alerts in response to credit inquiry requests when the user's credit file is locked. In the embodiment illustrated, credit data is shown being received by a credit bureau 164 from various entities, such as a bank 230, a credit card company 231 and an account provider 232. Credit data may additionally be received from lenders and/or other financial institutions (not illustrated). The credit bureau includes a processing queue 242 for receiving and routing the incoming credit data. Tradeline data, e.g., information regarding credit and debit accounts of the user, may be transmitted to the credit data store 222. For example, a credit module operated by the credit bureau 164 may determine appropriate credit data and other user information to be stored in credit data store 222 based at least in part on the data received from the various entities 230-232.

The credit data store 222 may be monitored periodically, such as via a batch process, to identify changes to credit data stored by the credit bureau. For example, the credit bureau may nightly scan the credit data store for changes to user credit files. In one embodiment, the batch monitor 206 looks for changes to credit files of users that are enrolled in a credit monitoring service of one or more affiliates of the credit bureau. A credit monitoring service may generally include a service with which individuals maintain an account in order to be alerted when a change posts to the individual's credit data or credit report, which may include an inquiry being noted in the individual's credit data. In the embodiment of FIG. 2, a user credit monitoring service performs and/or requests that the batch monitor 206 perform a batch process to identify changes to credit data associated with customers of the user credit monitoring service. For example, the credit monitoring service may periodically pull identified credit changes and determine which alerts correspond to customers of the credit monitoring service. Once customers for particular changes are identified, information regarding the change may be transmitted to the user. A few hours to a few days may pass between the credit data being received by the credit bureau and the provision of notifications to users regarding changes to the affected user.

Also shown in FIG. 2 are requests for user credit data that might be received by the credit report access control system 100. Depending on the embodiment, the credit report access control system 100 may be operated and/or controlled by the credit bureau 164 or may be operated and/or controlled by a separate entity, such that communications between the system 100 and the credit bureau 164 are via one or more network connections. Credit requesting entities, such as credit requesting entity 202, may include lenders, car dealers, brokers, retailers, landlords, and/or any other entity that is interested in user credit data. Requests for credit data are generally referred to herein as inquiries, inquiry requests or credit inquiry requests. In addition to providing the requested credit data (such as a credit report regarding the user) to the credit requester, inquiry requests may be recorded in the credit file of the user, which may be stored in credit data store 222. Thus, inquiry requests can be monitored by the batch monitoring processes that are performed by the credit bureau 164 (such as by batch monitor 206) and/or an affiliate of the credit bureau (such as by credit monitoring service), which may include a credit data reseller or a third-party credit monitoring service. However, providing alerts in this manner may result in the customer of a credit monitoring service receiving notification of an inquiry request days after the inquiry request was made. If the inquiry request was fraudulent (e.g., made by someone that was not authorized to receive credit data associated with the customer and/or to open a credit account in the name of the customer), the customer would be better served to receive the notification earlier, such that action may be taken to minimize damage to the customer's identity, finances and/or credit file. Additionally, if the user's credit file is locked, such that the credit file of the user is not provided to the requesting entity 202, a change (e.g., a soft or hard inquiry) in the credit data of the user may not be recorded and, thus, the user would not receive any indication of the received credit inquiry. As discussed below, the system 100 addresses this technological problem by providing a system and user interfaces that allow a user to receive alerts of credit inquiries, even when the user's credit file is locked, and determine desired actions to be taken in response to the credit inquiry.

In the embodiment of FIG. 2, the credit report access control system 100 provides users with real-time notifications of inquiry requests. In this embodiment, the credit report access control system 100, which initially receives the inquiry request from the credit requesting entity 202, provides inquiry request notices upon receipt of a new inquiry alert from a credit requesting entity 202. For example, the credit bureau may provide the inquiry request notices to the credit report access control system 100 regardless of whether the credit file of the user is locked. Additionally, in cases where credit data of the user would be provided to the requesting entity 202, an inquiry request notice may be provided to the user prior to providing the requested credit data to the credit requesting entity 202 and/or recording the inquiry request in the user's credit data (e.g., prior to storing data associated with the inquiry request in credit data store 222). In other embodiments, the credit report access control system 100 may provide the inquiry request notices substantially contemporaneously with recording the inquiry request in the user's credit data and/or retrieving credit data to provide to the credit requesting entity.

Credit inquiry alerts may be provided to the user in various manners, as described further below. For example, as illustrated in the example of FIG. 2, inquiry alerts generated by the credit report access control system 100 may be sent to a user device 162. Similarly, the user may access alert details by requesting additional information from the credit report access control system 100. The credit report access control system 100 may retrieve contact information for the user from an account data store operated by a credit monitoring service, for example, which may include an email address, telephone number, account user name, etc. The credit report access control system 100 may send or otherwise provide an alert to the user and/or a user device 162 associated with the user based on the retrieved contact information. Alerts may be delivered via any medium, such as, for example, an online portal that is accessible to alert members (e.g., a credit monitoring website), SMS text message, push notification to a mobile device (e.g., to a credit monitoring mobile application), email, printed digests, a mobile application, automated or personal telephone call, etc. In some embodiments, the alert may include detailed information associated with the inquiry, such as information identifying the credit requesting entity 202, the time of the inquiry, the data requested (e.g., whether a full credit report was requested), etc. In other embodiments, the alert may not include any specific information regarding the inquiry, but may notify the user that he should access his account with the credit monitoring service and/or review his credit data with credit bureau 164 in order to obtain further details.

In some embodiments, the user device 162 may transmit an unlock authorization. The unlock authorization may be sent to the credit report access control system 100, to the credit bureau 164, or any other entity that may perform or process an unlock action on a credit file. The user device 162 may display a user interface allowing the user to select an unlock authorization, which then would send an unlock authorization. Example of user interfaces that may be provided to the user to allow easy, yet secure, access to the user's credit data are provided in FIGS. 6 and 7.

The user device 162 may automatically send an unlock authorization based on a user's predetermined preferences (e.g. preferences stored in the user lock status & preferences data structure 161). In other embodiments, an unlock authorization may not need to be sent, but may automatically be determined (e.g. within the credit report access control system 100) based on the user preferences. For example, an unlock authorization may be initiated in response to the inquiry request of the credit requesting entity 202 and the preconfigured preferences for the credit file stored in the user lock status & preferences data store 161. The unlock authorization may be for a particular credit requesting entity 202, for a particular time period, and/or include other variations specific to the user and/or requesting entity 202. In a similar manner, the user may provide a lock authorization, such as of all of the user's credit data, for the particular credit requesting entity 202, for a portion of the credit data, and/or based on other preferences of the user.

Example User Preferences

FIG. 3 is a diagram illustrating a portion of an example user lock status & preferences data structure, for example the user lock status & preferences data structure 161 of FIG. 2. As shown, the data structure 161 may include enrollment information 310 associated with a user, such as a name, address, phone number, email address, and the like. The user lock status & preferences data structure may also include various personal identifiers 320 associated with the enrollment information of respective users that authenticate a user's identity to the credit report access control system 100. In the illustrated embodiment, a user personal identifier may comprise a user-selected PID, e.g., a PIN, a username/password combination, biometric data (e.g. fingerprint or eye scanner), and/or other information that can be used to authenticate a user.

In addition, the user lock status & preferences data structure 161 further includes access codes 330 that can be used to lock or unlock credit files of the associated user at respective credit bureaus, including access code 330A that is usable to apply access restrictions for Joe Smith at a first credit bureau and access code 330B that is usable to apply access restrictions for Joe Smith at a second credit bureau. In the embodiment shown in FIG. 3, the access codes include numerical codes or identifiers, but could include any other form of data, such as alphanumeric, encrypted, hashed, etc. data. In the embodiment shown in FIG. 3, once a particular user is identified in the user lock status & preferences data structure, e.g., by locating a user PID (or other personal identifier 320) received from a merchant POS device or user computing device in the data structure, the access codes for each of multiple credit bureaus are identified and may be used to initiate the requested access controls, such as locking or unlocking the user's credit file, without further involvement from the user.

The user lock status & preferences data structure 161 may also include user preferences 340 for additional access controls of the user's credit data. User preferences may indicate, for example, actions for the system 100 to take upon a credit inquiry request, including actions when the credit file is locked. For example, the user preferences 340 may include a toggle that indicates whether inquiry alerts received when the credit file is locked are to be sent to the user. The user may also indicate one or more other entities (such as a credit bureau, the credit requesting entity, or other third parties) to which alerts should be sent. The user preference may include the type of information included in the alert (such as whether information on the requesting entity should be added to the alert). The user preference may also include an unlock or lock time period that allows the credit file to be unlocked for a particular period of time (e.g. 5 minutes) allowing for the requesting entity to access the credit file. The user preferences may also include indications of access rights associated with particular purposes of inquiry alerts. The user preferences may also include preferences for providing only portions of the user's credit data to particular entities, for particular purposes, and/or based on other criteria. In some embodiments, user preferences may include any other rules for controlling access to the user's credit data.

Example Real-Time Alert and Selective Credit Access Process

Figure 4:
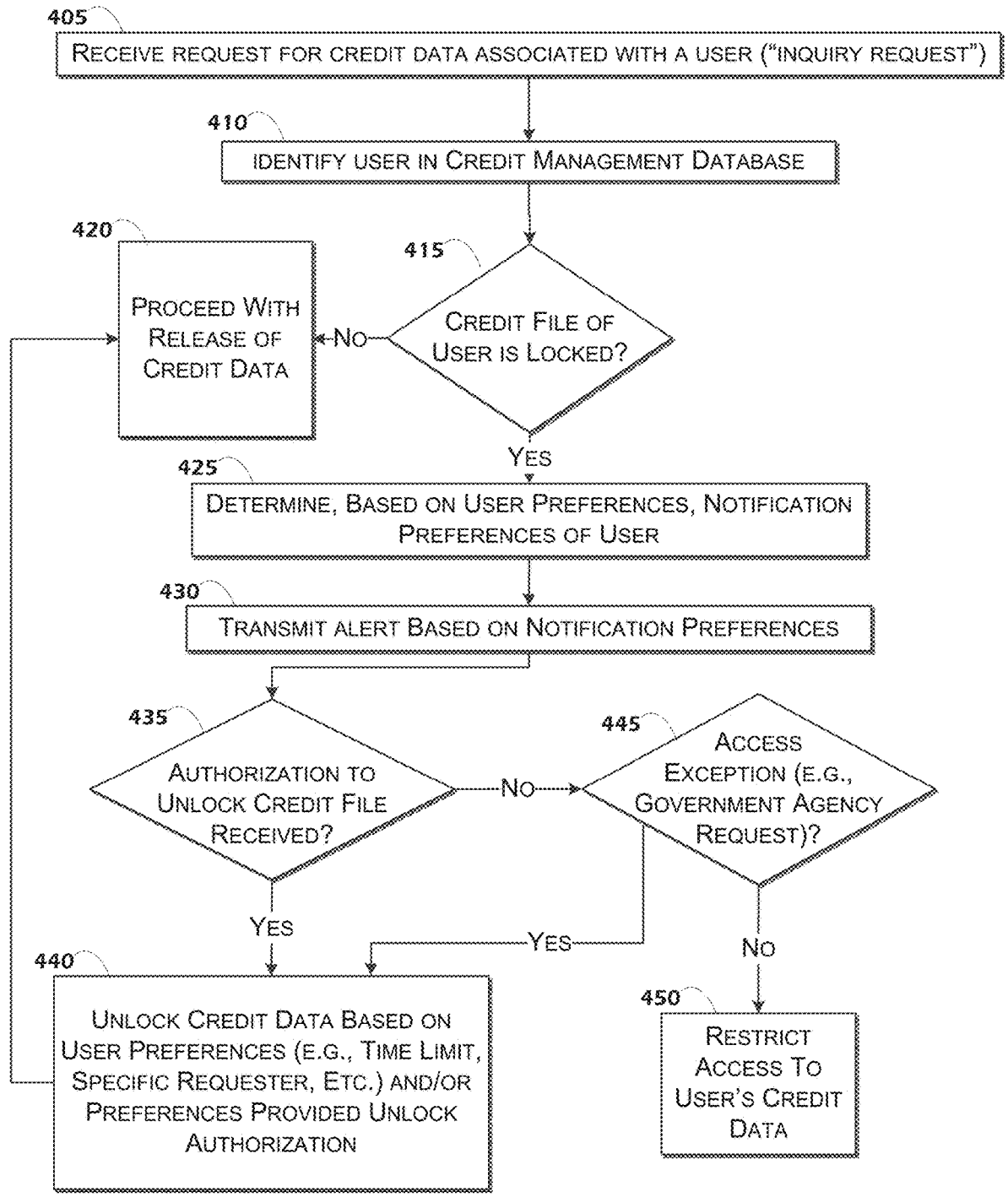
FIG. 4 is a flowchart illustrating one embodiment of a method for providing a real-time inquiry alert to a user and unlock credit data.

FIG. 4 is a flowchart illustrating one embodiment of a method for providing a real-time inquiry alert to a user with an active lock on the user's credit data, with an option for the user to unlock the credit file for immediate access. Depending on the embodiment, the method of FIG. 4 may include additional or fewer blocks and/or the blocks may be performed in a different order than is illustrated. For ease of discussion, the method of FIG. 4 is described below as being completed by the credit report access control system 100. However, the method may be implemented by any other device, or combination of devices, such as computing devices associated with a credit bureau, an affiliate or credit reseller associated with a credit bureau, and/or a credit monitoring service.

The illustrative method begins at block 405, where the credit report access control system 100 receives an inquiry request requesting credit data associated with an individual. The inquiry request may include, for example, a request for a credit report, a credit score, and/or specific portions or fields of credit data associated with the individual. In some embodiments, the credit inquiry may be sent by a computing system associated with the requesting entity 202 to a credit bureau or credit reseller, which may in turn provide the inquiry or notification of the inquiry to the credit report access control system 100. For example, the credit bureau or credit reseller may operate in a manner in which notification of a credit inquiry is automatically sent or otherwise provided to the access control module when the inquiry is received, such that the credit report access control system 100 may process the inquiry notification for alert purposes in parallel with, prior to, or otherwise without regard to the credit bureau's processing of the request for credit data. In other embodiments, the credit report access control system 100 may receive the credit inquiry directly from the credit requesting entity.

At block 410, the credit report access control system 100 analyzes the inquiry request to identify user identity information associated with the inquiry request. In some embodiments, analyzing the inquiry request may include parsing the request to extract user identity information, such as a name, social security number, address, employer, etc. In some embodiments, the system 100 receives the user information from a third party, such as directly from a credit bureau or a credit monitoring service provider.

Next, in block 415 the credit report access control system 100 identifies any access control restrictions associated with the user's credit data, such as determining whether the credit file of the user is locked, unlocked, frozen, unfrozen, thawed, or other condition. In the example process of FIG. 4, if the credit file is unlocked (or unfrozen or in another condition that would allow release of the credit data in some embodiments), then at block 420 the system 100 proceeds with the release of the credit data. In some embodiments, the release of credit data is subject to one or more regulations, such as FCRA regulations in the United States, such that credit data may only be releases if there is a "permissible purpose" for the release. The system 100 may determine whether the credit data of the user should be released pursuant to any such regulations or another entity may make the determination. Returning to decision block 415, if the credit file of the user is locked (or frozen or in another condition that would disallow release of the credit data in some embodiments), then the method proceeds to block 425.

At block 425, the system 100 retrieves user preference information associated with the user. In some embodiments, the user preference information may be retrieved from a data store associated with members of a notification service (e.g., a credit monitoring service), such that the user preference information includes details provided by the individual when signing up for the service. For example, a user may sign up for a credit monitoring service, and during enrollment, may have an option to select receiving an alert upon a credit inquiry and/or other user preferences for the content, delivery channel, etc. of any alerts/notifications. In other embodiments, the user preference information may alternatively or additionally be retrieved from one or more other data sources, such as the user lock status & preferences data structure 161 discussed above, or from profile data or account data maintained by a third-party service with which the individual maintains contact information and/or other personal information. The retrieved contact information may include, for example, a phone number, email address, mailing address, account name or user name, IP address, or device identifier. In some embodiments, the system 100 may additionally retrieve notification preferences associated with the individual, such as information identifying the method of notification, the amount of information in the notification, the frequency or timing of the notification, or the like.

Next, at block 430, the system 100 generates an alert for delivery to the user. Advantageously, the alert may be generated even if the user's credit file is locked, or without regard to any other access restrictions associated with the user's credit data or how the credit bureaus may or may not indicate the inquiry request in the user's credit data. In some embodiments, generation of the alert may be based on the inquiry being received without requiring the credit file to be unlocked, and not dependent on a change to stored credit data of the user. In some embodiments, generating an alert may include storing information indicating that an alert associated with the individual is available, such that the individual will be notified of the alert at a later time, such as during a batch process. In other embodiments, the generated alert may be delivered or otherwise provided to the user immediately after the alert is generated. The information included in the generated alert may be limited, in some embodiments, to an indication that an inquiry has been received regarding the individual. In other embodiments, the generated alert may include details regarding the inquiry, such as information identifying the requesting entity (such as a financial institution or other entity described above), a third party associated with the requesting entity (such as a retail store associated with a credit card issuer that submitted the inquiry), a time and date of the inquiry, the data requested (e.g., whether a full credit report was requested), and/or a geographic location associated with the inquiry.

Once the alert has been generated, the system 100 delivers or sends the generated alert to the individual (such as to a user computing device associated with the individual) based on the notification preferences information retrieved at block 425. As will be appreciated, the alert may be provided in a variety of ways depending on the contact information, contact preferences and/or the embodiment. For example, providing the alert may include, but is not limited to, sending a notification to a mobile application on the user computing device (e.g., a smart phone), causing activation of the mobile application on the user computing device without any user interaction, and displaying the alert message on the user mobile device. In some embodiments the alert may be transmitted by sending a text message, sending an email, making a phone call, leaving a voicemail, sending a letter, providing alert information when the user logs into an account or launches an application, etc. In some embodiments, an alert may be delivered to the individual regardless of whether the inquiry is a hard inquiry of soft inquiry. In other embodiments, alerts may only be provided to the user for hard inquiries. In embodiments in which an individual may receive an alert associated with a soft inquiry, the alert may notify the user that there "may" be a change to the user's credit report, since a soft inquiry might never post to the individual's credit report.

In some embodiments, the system 100 may communicate with the credit bureau 164 and/or credit requesting entity 202 to operate in a closed loop manner. For example, in one embodiment the credit bureau may wait for confirmation from the user that credit information may be released to the credit requesting entity 202 before providing the user's credit information to the credit requesting entity. For example, the inquiry alert may request that the user respond within a specified time period indicating whether the credit data should be released to the credit requesting entity 202, and may default to either releasing or not releasing the data if no response is received, depending on the embodiment. In some embodiments, the time period may be included in the user lock status and preferences data structure 161, for example.

In block 435, in some embodiments, alerts may provide the receiving users the ability to unlock credit data, allowing a particular requesting entity (or all requesting entities in some embodiments) to access the user's credit data. If the user selects the option to unlock the credit data, the method continues to block 440 where the credit data is unlocked. The credit data may also be unlocked based on user preferences stored in the user lock status and preferences data store 161. For example, the credit data of the user may be unlocking according to particular time limit, requesting entity, requested purpose, or other preferences established by the user and/or default unlock preferences (such as user preferences 340 discussed above). Thus, if the user has indicated that unlocks are to be for 15 minutes and only to the particular requesting entity associated with the alert, credit data of the user is available to only the particular requesting entity for 15 minutes.

As an example of the real-time alert and unlock option that may be provided by the system 100, a user may receive an alert indicating that credit information for the user has been requested by a given entity that is transmitted immediately after the credit inquiry is received by the system 100 and/or a credit bureau, such as within seconds or minutes of a merchant requesting credit data of the user. In some embodiments, the alert includes information regarding the requesting entity, such as identifying a name of the requesting entity (e.g., "Big Box Department Store"). If the user is not familiar with the requesting entity, the user can respond to the alert requesting credit information remains locked. The response, or a subsequent response, may indicate that the requesting entity should be provided with an indication that the request may be associated with actions of an identity thief. Additionally, the response, or a subsequent response, may request one or more protective actions, such as putting additional access restrictions on the user's credit file, for example, extending the lock to all requesting entities if it is currently for only certain requesting entities or adding a lock for the particular requesting entity. These actions may be selected individually or collectively based on the user's preferences, for example. In other embodiments, fewer or additional actions may be taken in response to a user indicating that a received alert is not a result of activity by the user. In some embodiments, an electronic alert may include a link or button that the user can select in order to allow the credit data to be provided in response to the inquiry and another link or button that the user can select in order to prevent the credit data from being provided.

Depending on the embodiment, the determination at block 435 may be performed based on various data, inputs, and/or criteria. For example, the authorization to unlock the user's credit file may be received from the user (e.g., via a mobile application into which the user provides an unlock input), determined by circumstances of the situation (e.g., rules that may automatically unlock the user's credit file based on the particular requester, purpose of the request, etc.), determined based on user or system preferences in a data store, or the like.

If at block 435 authorization is not given to unlock the credit file, the method continues to block 445 where the system 100 determines if an access exception applies. An access exception applies when credit data is provided regardless of whether the user's credit data is locked. For example, federal, state, and local government agencies have access to credit data in some circumstances (e.g. in support of a child support claim). In this case, regardless of whether the user authorizes unlocking of credit data at block 435, the credit data of the user would be released at block 420. If an access exception does not apply, then the method would proceed to block 450 where access to the credit data is blocked so that the requesting entity does not obtain any of the user's credit data. In some embodiments, block 445 is performed concurrently or before block 435, where if an access exception applies, then the credit data is provided to the requesting entity without having to determine if authorization to unlock the credit file has been received from the user.

Example User Interfaces & Additional Embodiments

Figure 5A:
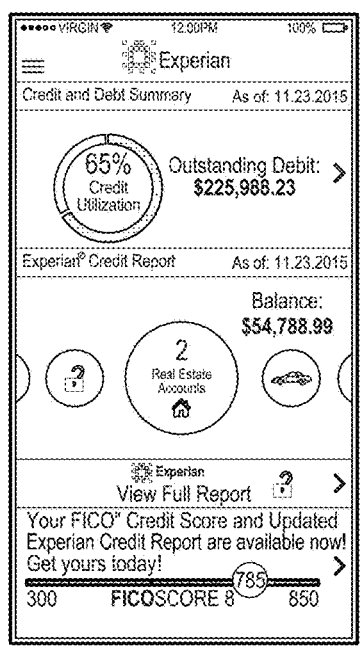
Figure 5B:
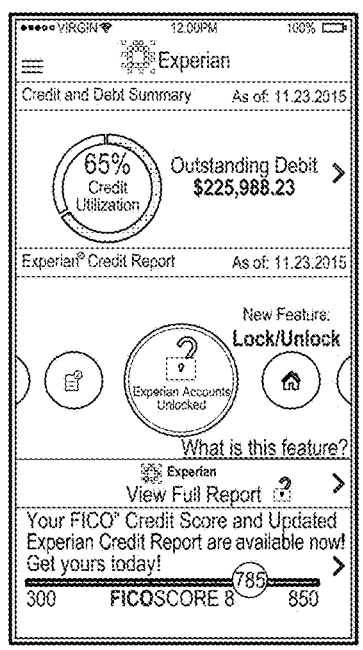
Figure 5C:
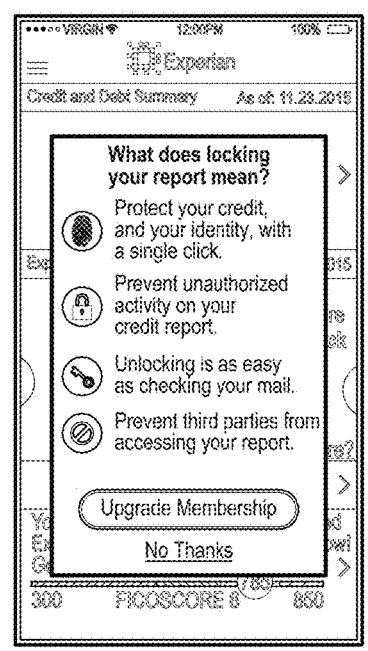

FIGS. 5A-5F are user interfaces illustrating example embodiments for providing an alert and allowing the user to quickly and easily unlock the credit file. The user interfaces in FIGS. 5-8 are adapted for display on a mobile device, but similar user interfaces may be provided on any other computer display, such as in a browser on a display screen. In FIG. 5A, an example dashboard for a user's credit monitoring account, for example, is illustrated. In this example, the dashboard includes various statistics, such as outstanding debt, balance on accounts, an option to access a full credit report, and a credit score (e.g. FICO score). The user can swipe left (or right, or provide another input in other embodiments) to access the user interface of FIG. 5B, where the user account is shown to be "unlocked." In this example embodiment, the user is notified of this "new feature" to lock and unlock the user's credit file via the application, and is given the option to click "What is this feature?" that will allow the user to access the user interface of FIG. 5C. The user interface of FIG. 5C provides a description of the locking feature and related advantages. The description explains that a credit file can be protected using biometric scanners (e.g. a finger print) to protect credit information, to prevent unauthorized activity on a credit report, ease of locking and unlocking, and preventing third parties from accessing a report. The user interface also allows the user to select user registration which enables the user to register to use the lock/unlock feature of the application, such as using a user interface similar to FIG. 5F. In some embodiments, the user is not required to separately register to use the lock/unlock feature. For example, the lock/unlock functionality discussed herein may be providing to users of a credit monitoring service, whether a free or paid service. In some embodiments, a user may be enrolled in a credit monitoring service that is free, and may be provided with an offer to upgrade the free account to a paid account in order to access the real-time locking/unlocking features discussed herein.

Alternatively in FIG. 5A, the user can select an option to see the full credit report, which would present a user interface similar to the example of FIG. 5D. The user interface can show details on account information (e.g. total open or closed accounts), credit inquiries (e.g. reported inquiries by requesting entities), public records, a status on the credit report (e.g. locked, unfrozen, thawed), personal information of the user, and summary statistics (e.g. debt, credit available). The user can select the lock/unlock option which can transition to a user interface similar to the example in FIG. 5E. In this example, the user interface includes a description of a lock and an option to register for the lock/unlock option (similar to that of FIG. 5C). FIG. 5E can also be accessed by clicking the option in FIG. 5B to lock/unlock their credit report. Then, the user can select an option to register for the lock/unlock option, which would transition the user interface to the one in FIG. 5F, where the user can register for the lock/unlock feature.

Figure 6A:
FIGS. 6A-6J are user interfaces illustrating one embodiment for requesting a lock and an unlock of the credit file.
Figure 6B:
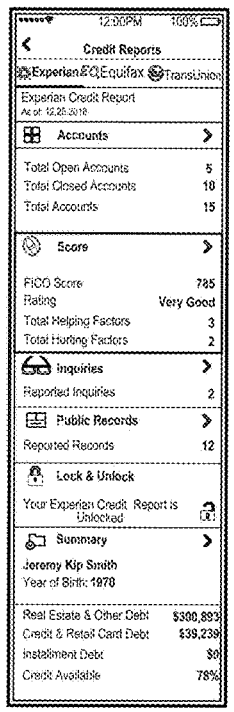
Figure 6C:
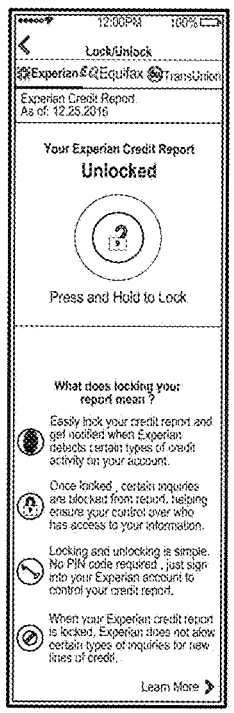
Figure 6D:
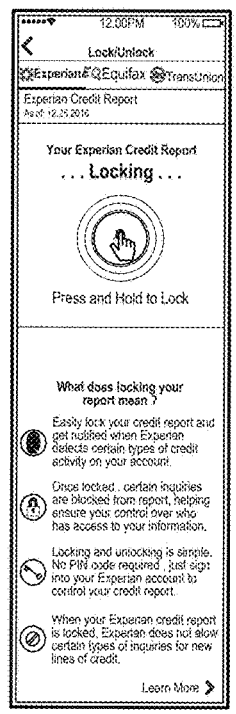

FIGS. 6A-6J are user interfaces illustrating another embodiment for displaying various credit data of a user and providing lock and unlock functionality. FIG. 6A illustrates an example dashboard for an account of a user showing various statistics. The dashboard can include aspects of a user's credit file, e.g. FICO score over a period of time, a score simulator, outstanding debt, suggestions on how to improve a credit score, viewing the full credit file, and a lock/unlock function. The user may have the option to view the full credit file, which would transition the user interface to that of FIG. 6B. The user interface of FIG. 6B can show particular details of a credit file, such as the total number of accounts, FICO scores and factors that can help or hurt such a score, inquiries of credit data, public records, an option to lock or unlock, and information on the user such as personal information or other statistics (debt or credit available). The user can click the lock/unlock option transitioning the user interface to that of FIG. 6C. Alternatively, the user can click the lock/unlock option at the user interface of FIG. 6A to directly transition to the user interface of FIG. 6C. FIG. 6C shows that the credit report is "unlocked," and provides a description on what it means to lock a credit file (similar to that of FIG. 5C). The user can lock the credit report via a user interaction input. For example, the user can press and hold to lock the credit report, as shown in FIG. 6D where while holding the lock button, the user interface shows that the credit report is locking, and will do so as a security measure over a period of time. After the period of time elapses, the credit report is shown to be locked in FIG. 6E.

Figure 6E:
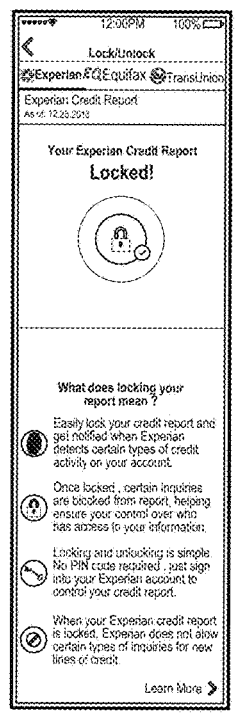
Figure 6F:
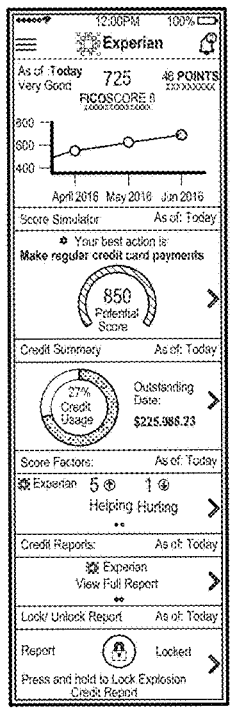
Figure 6G:

FIG. 6F illustrates an example dashboard (similar to that of FIG. 6A) illustrating a credit file that is locked. The user can select to view the full credit report which is shown in FIG. 6G (similar to that of FIG. 6B) while showing that the credit report is locked. The user can select the lock/unlock option in FIG. 6F or 6G to transition the user interface to the lock/unlock screen where an option is available to unlock the credit file and a description is provided describing what locking/unlocking means (similar to that of FIG. 6C). The user can unlock the credit report via a user interaction input.

Figure 6H:
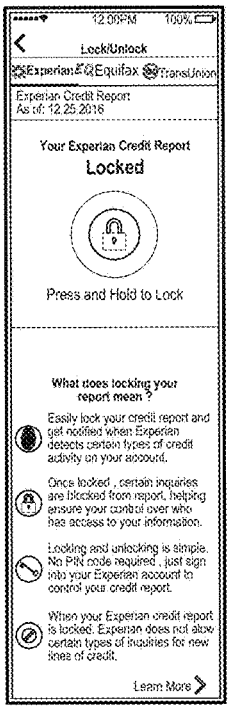
Figure 6I:
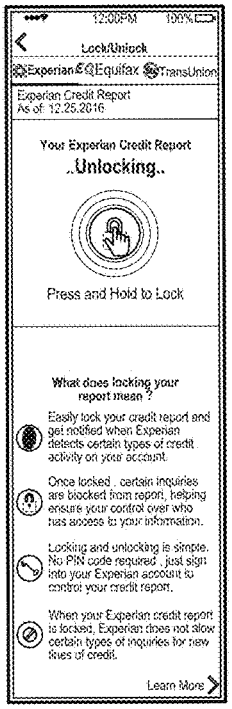
Figure 6J:
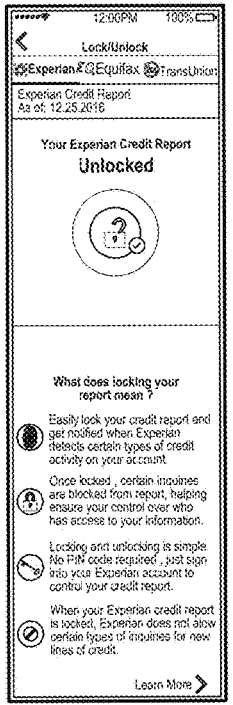

In some embodiments, such as in example user interfaces FIGS. 6C-6E, a user can lock their credit file through a "press and hold" gesture on an "unlock" icon displayed on the display. In some embodiments, the press and hold gesture requires the user to touch the icon for at least a predetermined time, such as 3 seconds, before unlocking of the user's credit file is initiated. Thus, if the user touches the icon (intentionally or unintentionally) for only 2 seconds, the credit unlock will not be initiated. In some embodiments, while the unlock icon is pressed the user interface is updated as the time pressed increases towards the predetermined time. For example, when the unlock icon is initially touched, the "Unlocked" indication may change to a "Locking" indication, then as the icon continues to be pressed, dots on either side of "Locking" appear, such as 1 dot on each side after 1 second pressing, 2 dots after 2 seconds pressing, etc., with the dots and "Locking" indication replaced by "Unlocked" in the user interface. In other embodiments, other visual indications may be used to indicate a time period that the user must press the icon to initiate locking of the credit file and/or a dynamically updating visualization of the current time pressed. Other visualization may indicate dials, bars, numerical counters, etc. As shown in FIGS. 6H-6J, similar user interface interactions may be performed to initiate unlocking of a locked credit file. Other visualizations and/or user inputs may be required for locking/unlocking of credit files, such as, for example, a pin or code, a simple click, a puzzle, other biometric sensors.

FIGS. 7A-7B are user interfaces illustrating one embodiment for a credit inquiry alert on a mobile phone that allows the user to authorize an unlock. FIG. 7A illustrates an example alert 705 displayed on a mobile phone notifying the user that a request for credit data has been received by a requesting entity, and also confirming that the credit file of the user is locked. Alert 705 may be displayed at block 430 of FIG. 4, for example. In this example, the alert 705 is a push notification that automatically displays on the mobile device regardless of the applications opened or active on the mobile device. Thus, the alert advantageously provides the user with information regarding the inquiry immediately after the credit request is made by the requesting entity. As discussed above, the alert can activate an application on the mobile device, be delivered via SMS, or in any other format.

In the example of FIG. 7A, the user can select the alert to cause information to be presented to the user, such as the information shown by the user interface in FIG. 7B. Depending on the embodiment, the alert can provide various information on the requesting entity, explanation on certain options for the user, and buttons enabling a user to respond. For example, the alert may provide the name, address, or other information on the requesting entity. The explanation may provide options, such as unlocking the report for only the requesting entity, continue the lock on the requesting entity, unlocking for a period of time or particular purpose, unlocking portions of the credit data, or the like. The user can then press and hold the unlock icon for a period of time (e.g. 3 seconds) to unlock the credit file for the requesting entity (here, "XYZ Car Company"), such as via the various user interface interactions or gestures discussed above.

FIGS. 8A-8C are example user interfaces illustrating additional credit-related information that may be provided to a user, such as credit history. FIG. 8A illustrates an example user interface summarizing alerts and history. For example, the first entry 802 shows the credit file as locked, the second entry 804 shows the credit file as unlocked, and the third entry 806 shows a specific credit inquiry that was blocked in view of the user's credit file being locked. FIG. 8B shows more information on the credit lock of the first entry 802 with a description on the lock feature of the credit file and an option to "change status," which would enable the user to unlock the credit file. FIG. 8C provides detail on the blocked inquiry request in the third entry 806. For example, the additional information in third entry 806 can provide information on when the request was made, information on the requesting entity, the purpose of the inquiry, the type of information requested, and/or the credit bureau (or other third party) that the request was made to.

Figure 9A:
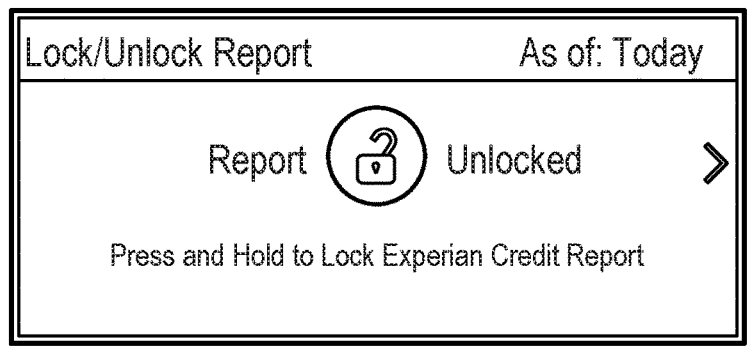
FIGS. 9A-9D are portions of a user interface illustrating an example animation indicating lock status.
Figure 9B:
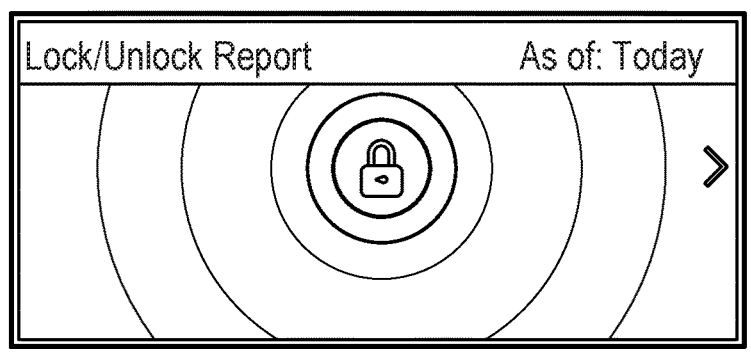
Figure 9C:
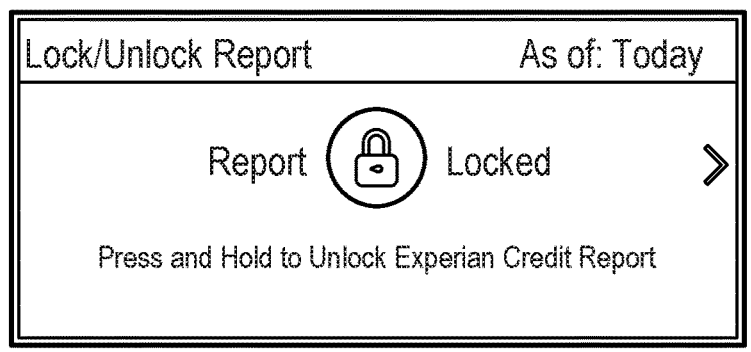

FIGS. 9A-9D are portions of a user interface illustrating example animations indicating lock/unlock status of a consumers regulated data (e.g., credit data). The illustrated user interface portions may be part of an alert provided to the user, such as in response to an inquiry request being received, part of a mobile application (e.g., a credit monitoring application), part of a desktop application, part of a website that may be displayed in a browser, or any other user interface that may be provided to the user to indicate lock/unlock status and allow easy updating of that status. In this particular example, FIG. 9A includes an icon of an open physical lock with the text "Report Unlocked" shown. This figure further indicates that the user may "Press and Hold to Lock Experian Credit Report." Thus, in this embodiment when the user touches the blue circular icon, the icon is updated to indicate a locking process has been initiated. For example, FIG. 9B shows concentric circles around the central icon (which is now updated to show the physical lock image in a locked position and in red rather than blue). In some embodiments, the concentric circles are animated such that they each begins small immediately around the central lock icon and is animated as diameter increases, causing an effect similar to ripples moving outward after dropping a stone in water. In this embodiment, the colors are adjusted as the credit data lock/unlock status changes, here from blue when in the unlock state to red when in the locked or locking state. FIG. 9C illustrates an example of how this particular user interface may be updated after the locking process is completed, such as when the user maintains touch on the lock icon of FIG. 9B for a predetermined time, such as three seconds, five seconds, 10 seconds, etc. Thus, the illustration in FIG. 9C indicates to the user that the credit data is now locked.

Figure 9D:
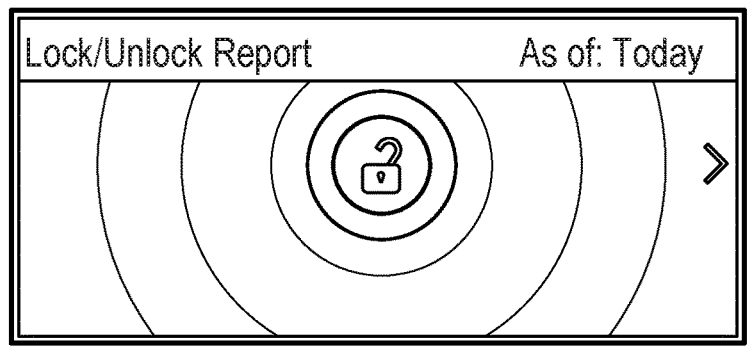

FIG. 9D illustrates an example visualization that may be provided when the user unlocks the credit data. Thus, from the locked state (e.g., FIG. 9C), the user may press the lock icon for a predetermined time to unlock the credit file. During this predetermined time, concentric circles similar to those in FIG. 9B may be displayed, such as in an animated pattern similar to discussed above (e.g., concentric circles that enlarge like ripples around a stone dropped in water). In some embodiments, the animation may be mirrored between the locking and unlocking actions. For example, during the locking action (e.g., FIG. 9 B), the circles may move outward from the central lock icon, while during the unlocking action (e.g., FIG. 9D), the circles may move inward towards the central lock icon. In other embodiments, other visualizations that indicate lock/unlock status, as well as animations or other indications of user interactions that cause changes of the lock/unlock state, may be used in conjunction with any of the processes or systems discussed herein.

Variations and Other Embodiments

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. The methods may be executed on the computing devices in response to execution of software instructions or other executable code read from a tangible, non-transitory computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

Although this disclosure has been described in terms of certain example embodiments and applications, other embodiments and applications that are apparent to those of ordinary skill in the art, including embodiments and applications that do not provide all of the benefits described herein, are also within the scope of this disclosure.

All publications and patent applications mentioned in this specification are herein incorporated by reference in their entirety to the same extent as if each individual publication or patent application was specifically and individually indicated to be incorporated by reference.

What is claimed is:

1. A system comprising:
a secured and regulated data store that stores regulated user credit information associated with a plurality of consumers, wherein the regulated user credit information is associated with member information indicating respective users enrolled in a fraud notification service, wherein the respective users enrolled in the fraud notification service comprise a subset of the plurality of consumers, wherein the secured and regulated data store is configured to be controlled by an access control system, wherein data stored in the secured and regulated data store indicates that a first subset of the plurality of consumers have locked credit files and a second subset of the plurality of consumers do not have locked credit files;
a computing device in communication with the secured and regulated data store and that is configured to prevent access to locked credit data of the first subset of a plurality of users and in response to an unlock request from a corresponding user, to override access preventions for one or more requesting entities but otherwise maintain the access preventions, the computing device further configured to:
  receive, from a user, a request to lock credit data associated with the user;
  execute a locking module of the access control system that causes the access control system to lock the credit data associated with the user in the secured and regulated data store;
  receive an inquiry request from a requesting entity, wherein the inquiry request includes a request for the credit data associated with the user, wherein the inquiry request is transmitted by the requesting entity in response to an online loan application initiated by the user;
  determine that the user is enrolled in the fraud notification service based at least in part by comparing inquiry information associated with the inquiry request and member information associated with the user, wherein the member information compared includes at least one of a name, a social security number or an address; and
  in response to receiving the inquiry request and determining that the user is enrolled in the fraud notification service:
    retrieve contact information associated with the user, wherein the retrieved contact information includes at least one of a phone number, an IP address, or a device identifier associated with a mobile device of the user;
    determine that the credit data of the user is locked;
    in response to determining that the credit data of the user is locked, generate an alert for delivery to the user before processing, by a credit bureau, credit data of the user responsive to the request, the alert including:
      at least a portion of the inquiry information identifying the requesting entity; and
      a user interface element enabling the user to unlock the credit data, the user interface element responsive to touch input of the user of touching the user interface element;

electronically provide the alert to the user based on the retrieved contact information, wherein electronically providing the alert to the user comprises sending the alert to the mobile device of the user as a push notification to an application operating on the mobile device, the alert configured for display of the at least a portion of the inquiry information identifying the requesting entity, wherein the application is configured to transmit an unlock request to the computing device based at least in part on user selection of the user interface element; and in response to receiving the unlock request from the mobile device:

automatically execute an access exception module of the access control system that causes the application of an override, to the access prevention that has been previously set on the credit data of the user, for the requesting entity in accordance with user-defined access preferences for the loan application, and subsequent to access of the credit data of the user from the secured and regulated data store in accordance with the application of the override, automatically removing the override and maintaining the access prevention, wherein maintaining the access prevention prevents the requesting entity from accessing the credit data of the user after the override has been removed.

2. The system of claim 1, wherein the user interface element includes a central icon, and wherein in response to a user's selection of the central icon to unlock the credit data, the alert displays one or more concentric circles around the central icon.

3. The system of claim 1, wherein the user-defined access preferences indicate one or more of an unlock time period or set of entities.

4. The system of claim 1, wherein the application transmits an unlock request to the computing device based at least in further part on a determination that the user touched the user interface element for a threshold time period.

5. The system of claim 1, wherein the application transmits an unlock request to the computing device further based on a user preference.

6. The system of claim 1, wherein the application of the override comprises allowing access to a first subset of the credit data and preventing access to a second subset of the credit data.

7. The system of claim 1, wherein the application of the override comprises allowing access only for the requesting entity.

8. The system of claim 1, wherein the application of the override comprises allowing access only for a particular purpose, wherein the purpose is associated with a reason for the inquiry request.

9. The system of claim 1, wherein the application of the override comprises allowing access only for a particular period of time.

10. A method comprising:

receiving, from a user, a request to lock regulated credit data associated with the user;

executing a locking module of an access control system that causes the access control system to lock the credit data associated with the user in a secured and regulated data store, wherein the regulated user credit information is associated with member information indicating respective users enrolled in a fraud notification service, wherein the respective users enrolled in the fraud notification service comprise a subset of the plurality of consumers, wherein the secured and regulated data store is configured to be controlled by the access control system, wherein data stored in the secured and regulated data store indicates that a first subset of the plurality of consumers have locked credit files and a second subset of the plurality of consumers do not have locked credit files;

receiving an inquiry request from a requesting entity, wherein the inquiry request includes a request for the credit data associated with the user, wherein the inquiry request is transmitted by the requesting entity in response to a loan application initiated by the user;

determining that the user is enrolled in a fraud notification service based at least in part by comparing inquiry information associated with the inquiry request and member information associated with the user, wherein the member information compared includes at least one of a name, a social security number or an address; and in response to receiving the inquiry request and determining that the user is enrolled in the fraud notification service:

retrieving contact information associated with the user, wherein the retrieved contact information includes at least one of a phone number, an IP address, or a device identifier associated with a mobile device of the user;

determine that the credit data of the user is locked;

in response to determining that the credit data of the user is locked, generating an alert for delivery to the user before processing, by a credit bureau, credit data of the user responsive to the request, the alert including:

at least a portion of the inquiry information identifying the requesting entity; and a user interface element enabling the user to unlock the credit data, the user interface element responsive to touch input of the user with respect to the user interface element;

electronically providing the alert to the user based on the retrieved contact information, wherein electronically providing the alert to the user comprises sending the alert to the mobile device of the user as a push notification to an application operating on the mobile device, the alert configured for display of the at least a portion of the inquiry information identifying the requesting entity, wherein the application is configured to transmit an unlock request based at least in part on user selection of the user interface element; and in response to receiving the unlock request from the mobile device:

automatically executing an access exception module of the access control system that causes the application of an override, to the access prevention that has bene previously set on the credit data of the user, for the requesting entity in accordance with user-defined access preferences for the loan application, and subsequent to access of the credit data of the user from the secured and regulated data store in accordance with the application of the override, automatically removing the override and maintaining the access prevention, wherein maintaining the access prevention prevents the requesting entity from accessing the credit data of the user after the override has been removed.

11. The method of claim 10, wherein the user interface element includes a central icon, and wherein in response to a user's selection of the central icon to unlock the credit data, the alert displays one or more concentric circles around the central icon.

12. The method of claim 10, wherein the user-defined preferences indicate one or more of an unlock time period or set of entities.

13. The method of claim 10, wherein the application transmits an unlock request in response to a time period of the user touching reaching a threshold time.

14. The method of claim 10, wherein the application transmits an unlock request further based on a user preference.

15. The method of claim 10, wherein the application of the override comprises allowing access to a first subset of the credit data and preventing access to a second subset of the credit data.

16. The method of claim 10, wherein the application of the override comprises allowing access only for the requesting entity.

17. The method of claim 10, wherein the application of the override comprises allowing access only for a particular purpose, wherein the purpose is tied to a reason for the inquiry request.

18. The method of claim 10, wherein the application of the override comprises allowing access only for a particular period of time.

* * * * *